US009918268B2

(12) United States Patent
Kimura et al.

(10) Patent No.: US 9,918,268 B2
(45) Date of Patent: Mar. 13, 2018

(54) COMMUNICATION CONTROL DEVICE, COMMUNICATION CONTROL METHOD, RADIO COMMUNICATION SYSTEM, BASE STATION, AND TERMINAL DEVICE

(71) Applicant: SONY CORPORATION, Tokyo (JP)

(72) Inventors: Ryota Kimura, Tokyo (JP); Thomas Bourgeois, Tokyo (JP); Ryo Sawai, Tokyo (JP); Hiromasa Uchiyama, Kanagawa (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 135 days.

(21) Appl. No.: 14/895,127

(22) PCT Filed: May 1, 2014

(86) PCT No.: PCT/JP2014/062109

§ 371 (c)(1),
(2) Date: Dec. 1, 2015

(87) PCT Pub. No.: WO2014/196295

PCT Pub. Date: Dec. 11, 2014

(65) Prior Publication Data

US 2016/0119850 A1 Apr. 28, 2016

(30) Foreign Application Priority Data

Jun. 5, 2013 (JP) ................................ 2013-118764

(51) Int. Cl.
*H04W 36/30* (2009.01)
*H04W 24/10* (2009.01)
*H04W 16/28* (2009.01)

(52) U.S. Cl.
CPC .......... *H04W 36/30* (2013.01); *H04W 16/28* (2013.01); *H04W 24/10* (2013.01)

(58) Field of Classification Search
None
See application file for complete search history.

(56) References Cited

U.S. PATENT DOCUMENTS

2006/0029021 A1* 2/2006 Sakawa ................ H04W 36/22 370/331
2006/0030323 A1* 2/2006 Ode ..................... H04W 36/30 455/436

(Continued)

FOREIGN PATENT DOCUMENTS

JP 2011-91785 A 5/2011
WO 2006/004463 A1 1/2006
WO 2009/093314 A1 7/2009

OTHER PUBLICATIONS

Murray, Ken et al., "Network Access and Handover Control in Heterogeneous Wireless Networks for Smart Space Environments", 1st International Workshop on Managing Ubiquitous Communications and Services (MUCS), Dec. 11, 2003, Waterford, Ireland.*

*Primary Examiner* — Faruk Hamza
*Assistant Examiner* — Cassandra Decker
(74) *Attorney, Agent, or Firm* — Oblon, McClelland, Maier & Neustadt, L.L.P.

(57) ABSTRACT

[Object] To make it possible to select an optimum connection destination cell in consideration of an influence of future control
[Solution] There is provided a communication control device including an interference control unit configured to perform interference control for a radio communication system including a plurality of base stations and a plurality of terminal devices, and a decision unit configured to correct a decision index which is based on a measurement report generated by a first terminal device by factoring in an influence of the interference control performed by the interference control unit after the first terminal device performs (Continued)

measurement and to perform handover decision on the first terminal device using the corrected decision index.

14 Claims, 24 Drawing Sheets

(56) References Cited

U.S. PATENT DOCUMENTS

| | | | | |
|---|---|---|---|---|
| 2009/0279512 | A1* | 11/2009 | Fujishima | H04B 7/0617 370/336 |
| 2010/0029276 | A1* | 2/2010 | Hwang | H04W 36/30 455/436 |
| 2010/0112952 | A1* | 5/2010 | Molnar | H01Q 1/246 455/63.1 |
| 2010/0284373 | A1* | 11/2010 | Makino | H04W 36/30 370/332 |
| 2011/0009157 | A1* | 1/2011 | Osterling | H04L 1/0001 455/522 |
| 2013/0051332 | A1* | 2/2013 | Sridhar | H04W 48/06 370/329 |
| 2013/0242941 | A1* | 9/2013 | Ebesu | H04W 36/245 370/331 |
| 2014/0274195 | A1* | 9/2014 | Singh | H04W 52/241 455/522 |
| 2014/0293953 | A1* | 10/2014 | Seo | H04L 5/0048 370/329 |
| 2015/0036522 | A1* | 2/2015 | Maruta | H04W 24/10 370/252 |
| 2015/0327289 | A1* | 11/2015 | Hessler | H04W 72/1268 370/336 |

* cited by examiner

COMMUNICATION CONTROL DEVICE, COMMUNICATION CONTROL METHOD, RADIO COMMUNICATION SYSTEM, BASE STATION, AND TERMINAL DEVICE

TECHNICAL FIELD

The present disclosure relates to a communication control device, a communication control method, a radio communication system, a base station, and a terminal device.

BACKGROUND ART

Recent radio communication environments have faced problems of depletion of frequency resources caused due to a rapid increase in data traffic. Accordingly, to increase network density and improve resource efficiency, network configurations in which a plurality of cells including macro cells and small cells are disposed in an overlapping manner can be adopted. For example, heterogeneous networks are networks that are formed in such a manner that various cells in which radio access technologies, cell sizes, or frequency bands differ coexist.

However, harmful interference easily occurs in environments in which a plurality of cells overlap. Accordingly, to prevent harmful interference, technologies for disposing control nodes that manage and control the direction of antenna beams, transmission power, or the like used by individual base stations or terminal devices within systems have been proposed (for example, see Patent Literature 1 below). Such control is sometimes performed to improve performance of the capacity, throughput, or the like of systems rather than preventing interference.

CITATION LIST

Citation List

Patent Literature 1: JP 2011-091785A

SUMMARY OF INVENTION

Technical Problem

In general, when quality of radio channels in serving cells to which terminal devices are currently connected deteriorates, the terminal devices perform handover procedures to switch connection destination cells to different cells. Serving base stations determine cells to which the terminal devices establish connection based on indexes included in measurement reports transmitted from the terminal devices. However, the serving base stations do not know future control content which has not been performed at the time of the handover decision. For this reason, situations in which subsequent optimum connection destination cells are not selected by the serving base stations while also considering an influence of the future control may occur.

Accordingly, it is desirable to provide a structure capable of resolving or at least alleviating the above-described trouble.

Solution to Problem

According to the present disclosure, there is provided a communication control device including: an interference control unit configured to perform interference control for a radio communication system including a plurality of base stations and a plurality of terminal devices; and a decision unit configured to correct a decision index which is based on a measurement report generated by a first terminal device by factoring in an influence of the interference control performed by the interference control unit after the first terminal device performs measurement and to perform handover decision on the first terminal device using the corrected decision index.

According to the present disclosure, there is provided a communication control method that is performed by a communication control device, the communication control method including: performing interference control for a radio communication system including a plurality of base stations and a plurality of terminal devices; correcting a decision index which is based on a measurement report generated by a first terminal device by factoring in an influence of the interference control performed after the first terminal device performs measurement; and performing handover decision on the first terminal device using the corrected decision index.

According to the present disclosure, there is provided a radio communication system including: a plurality of base stations; a plurality of terminal devices; and a control node configured to perform interference control for the radio communication system. The control node corrects a decision index which is based on a measurement report generated by a first terminal device by factoring in an influence of the interference control performed after the first terminal device performs measurement and performs handover decision on the first terminal device using the corrected decision index.

According to the present disclosure, there is provided a base station including: a communication unit configured to communicate with a communication control device that performs interference control for a radio communication system including a plurality of base stations and a plurality of terminal devices; and a control unit configured to cause the communication unit to transfer a measurement report generated by a first terminal device and used for handover decision to the communication control device that performs the handover decision on the first terminal device.

According to the present disclosure, there is provided a terminal device including: a radio communication unit configured to transmit or receive a radio signal using an antenna capable of beam steering; and a control unit configured to generate a measurement report used for handover decision and transmit, in the measurement report or apart from the measurement report, a corrected term indicating an influence of an antenna beam assumed to be formed by the antenna after measurement from the radio communication unit to a serving base station.

According to the present disclosure, there is provided a communication control device including: a control unit configured to perform control of radio resources for a radio communication system including a plurality of base stations and a plurality of terminal devices; and a decision unit configured to correct a decision index which is based on a measurement report generated by a first terminal device by factoring in an influence of the control of the radio resources performed by the control unit after the first terminal device performs measurement and to perform handover decision on the first terminal device using the corrected decision index.

Advantageous Effects of Invention

According to a technology according to the present disclosure, it is possible to select an optimum connection destination cell in consideration of an influence of future control.

DESCRIPTION OF EMBODIMENTS

Figure 1:
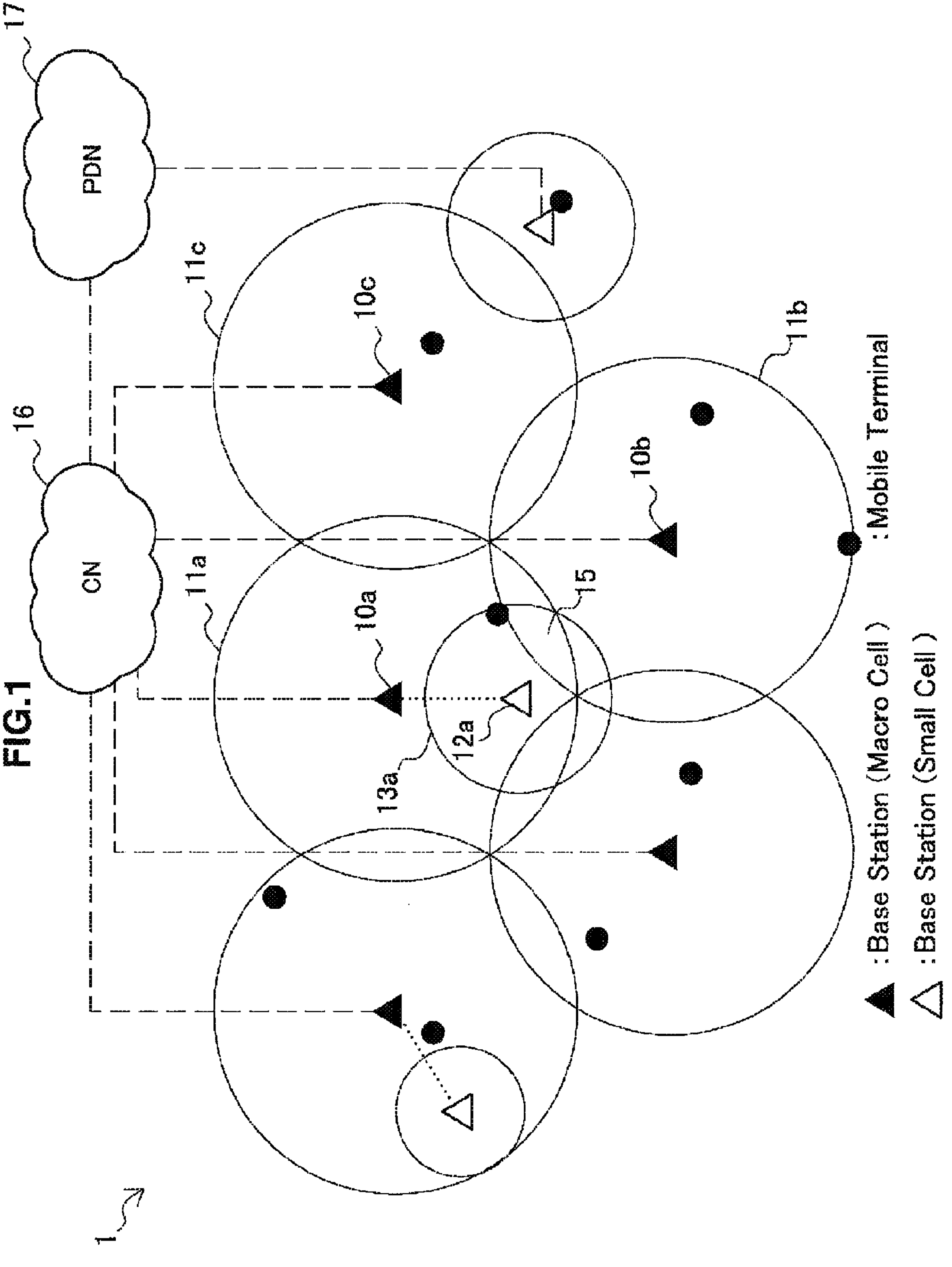
FIG. 1 is an explanatory diagram illustrating an overview of a system.

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be made in the following order.

1. Overview of system
2. Introduction of cooperation manager
3. Configuration example of cooperation manager
3-1. Configuration example of device
3-2. Flow of process
4. Configuration example of base station
4-1. Configuration example of device
4-2. Flow of process
5. Configuration example of terminal device
5-1. Configuration example of device
5-2. Modification examples
5-3. Flow of process
6. Conclusion <1. Overview of System>

First, an overview of a system will be described with reference to FIGS. 1 to 3. FIG. 1 illustrates a radio communication system 1 which is an example to which a technology according to the present disclosure is applied. Referring to FIG. 1, the radio communication system 1 includes a plurality of base stations denoted by triangular marks and a plurality of terminal devices denoted by circular marks.

For example, a base station 10*a* is a macro cell base station that provides radio communication services to terminal devices within a cell 11*a*. A base station 10*b* is a macro cell base station that provides radio communication services to terminal devices within a cell 11*b*. A base station 10*c* is a macro cell base station that provides radio communication services to terminal devices within a cell 11*c*. The base stations 10*a*, 10*b*, and 10*c* are each connected to a core network (CN) 16. These macro cell base stations may be evolved Node Bs (eNBs) that operate according to Long Term Evolution (LTE) or LTE-Advanced (LTE-A) or base stations (for example, base stations of a WiMax scheme or access points of a radio Local Area Network (LAN) scheme) that operate according to other radio communication schemes.

A base station 12*a* is a small cell base station that provides radio communication services to terminal devices within a cell 13*a*. The base station 12*a* is connected to the core network 16 via the base station 10*a*. A small cell base station may be connected to the core network 16 via a packet data network (PDN) 17 rather than a macro cell base station. In the present description, the concept of a small cell includes a femtocell, a nanocell, a picocell, and a microcell. A small cell base station may be a device dedicated for a base station (for example, as in a small-sized femtocell base station). Instead, a small cell base station may be a terminal device that has a mobile router function or a relay function. A radio network formed in a small cell is also referred to as a localized network. A link by which a small cell base station is connected to a macro cell base station or another control node is referred to as a backhaul link.

A terminal device 15 can be located within the cell 11*a* and can be connected to the base station 10*a*. The terminal device 15 may be user equipment (UE) that operates according to an LTE scheme or an LTE-A scheme or may be a mobile terminal that operates according to another radio communication scheme. When the terminal device 15 is connected to the base station 10*a*, the base station 10*a* is a serving base station of the terminal device 15 and the cell 11*a* is a serving cell of the terminal device 15. The serving base station performs various kinds of control such as scheduling, transmission power control, beam control, and rate control on an individual terminal device. In the example of FIG. 1, the terminal device 15 can be located within the cell 11*b* and can be connected to the base station 10*b*. The terminal device 15 can be located within the cell 13*a* and can be connected to the base station 12*a*.

When the base station 10*a* is a serving base station of the terminal device 15, the terminal device 15 measures the quality of a radio channel from a nearby base station periodically or according to a request from the base station 10*a*, generates a measurement report, and transmits the generated measurement report to the base station 10*a*. The measurement report includes decision of whether to switch a connection destination cell of the terminal device 15 to another cell, that is, a decision index used for handover decision. A typical example of the decision index included in the measurement report is reference signal received power (RSRP) measured for each cell.

Figure 2:
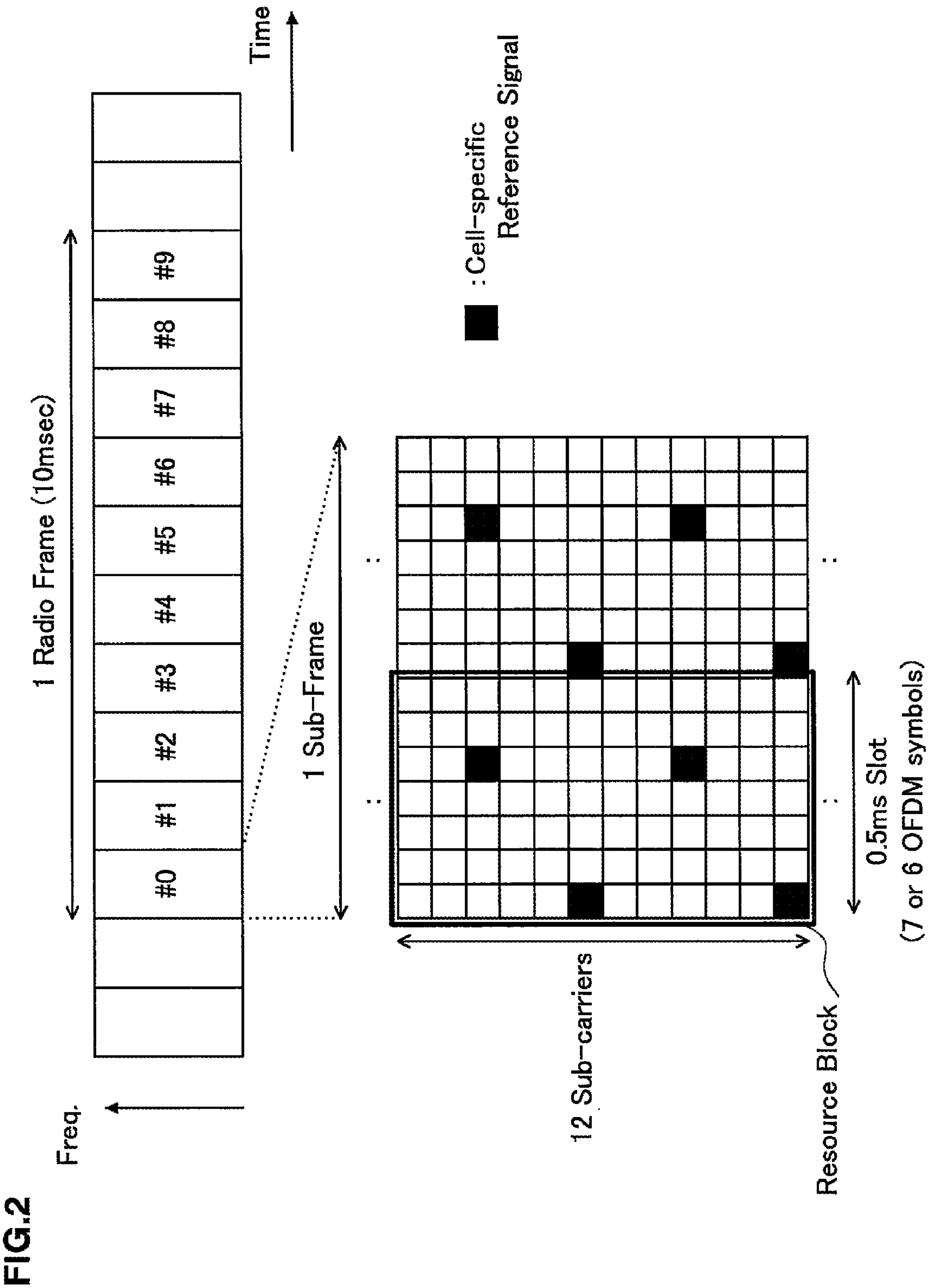
FIG. 2 is an explanatory diagram illustrating an example of the configuration of time-frequency resources.

FIG. 2 illustrates an example of the configuration of time-frequency resources in an LTE system as an example. In the upper part of FIG. 2, one radio frame with a length of 10 msec is illustrated. One radio frame is configured to include 10 subframes with a length of 1 msec. One subframe includes two 0.5 ms slots. One 0.5 ms slot generally includes 7 OFDM symbols (6 OFDM symbols when an extended cyclic prefix is used) in the time direction. A resource element refers to a time-frequency resource including one OFDM symbol and one subcarrier. A resource block refers to a time-frequency resource configured to include one 0.5 ms slot and 12 subcarriers. Communication resources are scheduled in units of one or more resource blocks. In a downlink channel of a frequency division duplex (FDD) system, a cell-specific reference signal (CRS) is disposed at intervals of frequencies corresponding to 6 subcarriers in the 0th symbol and the 4th symbol of each resource block. When multi input multi output (MIMO) transmission is performed, the disposition of the CRS can be offset for each antenna (not illustrated). In a downlink subframe of a time division duplex (TDD) system, a CRS can be also disposed similarly.

In general, the measurement report indicates an index such as RSRP measured by receiving the CRS. However, the following other kinds of downlink reference signals may be used to generate a measurement report:

1) Demodulation reference signal (DMRS): a reference signal also referred to as a UE-specific reference signal and disposed in a resource block assigned to an individual terminal device is used for channel estimation when downlink data is decoded;

2) MBSFN reference signal: this signal is used in an MBMS single frequency network (MBSFN);

3) Positioning reference signal (PRS): this signal is used to estimate the position of UE; and 4) Channel state information reference signal (CSIRS): this signal is mainly used to generate downlink channel state information (CSI).

Uplink reference signals can include the following signals:

1) Demodulation reference signal (DMRS): this signal is used for channel estimation when uplink data is decoded; and 2) Sounding Reference signal (SRS): this signal is mainly used to measure an uplink channel state.

Figure 3:
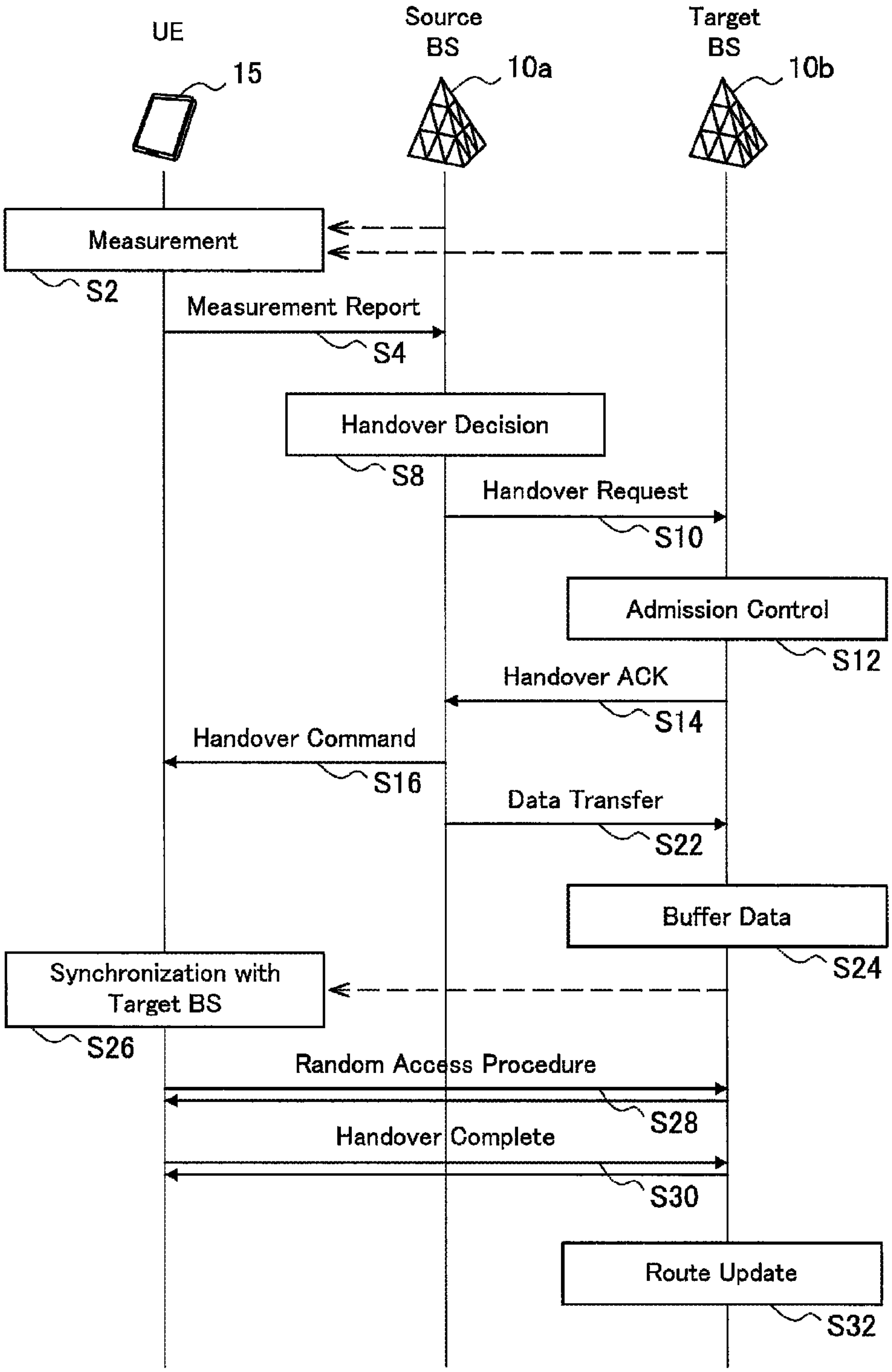
FIG. 3 is a sequence diagram illustrating a flow example of an existing handover procedure.

FIG. 3 is a sequence diagram illustrating a flow example of an existing handover procedure. The terminal device 15, the base station 10*a*, and the base station 10*b* are involved in the sequence illustrated in FIG. 3. In handover context, a serving base station before handover is referred to as a source base station and a serving base station after handover is referred to as a target base station. In the example of FIG. 3, the base station 10*a* is a source base station and the base station 10*b* is a target base station.

First, the terminal device 15 receives a reference signal transmitted from the base station 10 serving as the serving base station at this time and reference signals transmitted from at least one peripheral base station including the base station 10*b*, and then performs measurement (step S2). Then, the terminal device 15 transmits a measurement report including the decision index indicating a measurement result to the base station 10*a* (step S4).

The base station 10*a* receiving the measurement report performs handover decision (step S8). For example, when a decision index RSRPs for the serving cell and a decision index $RSRP_{Ti}$ for an i-th peripheral cell satisfy the following decision formula (1), the base station 10*a* can decide that the terminal device 15 performs handover with the base station of the i-th peripheral cell set as a target base station. A value of the decision index may be a decibel value or a linear value.

[Math 1]

$$RSRP_{Ti}+a_{Ti}>RSRP_S+a_S+b_S \quad (1)$$

In decision formula (1), weight parameters $a_{Ti}$ and $a_S$ indicate weights that are associated with the kinds of cells. For example, in a heterogeneous network, a terminal device can be preferentially connected to a small cell by setting the value of a weight parameter of the small cell to be larger than that of a macro cell. A weight parameter $b_S$ indicates a weight that is added to a decision index for a serving cell and has a role of preventing handover from occurring excessively frequently in a terminal device located near the edge of a cell. These weight parameters generally have positive values. As the values of the weight parameters are larger, a possibility of an associated cell being selected as a connection destination is larger.

When the base station 10*b* is selected as the target base station in the handover decision, the base station 10*a* transmits a handover request to the base station 10*b* (step S10). When the base station 10*b* receives the handover request, the base station 10*b* decides whether to receive the terminal device 15 by performing admission control (step S12). For example, the base station 10*b* may decide whether to receive the terminal device 15 by comparing the number of terminals with which connection is already completed to a capacity value (the number of connectable terminals) or comparing a suppliable throughput to a request throughput of the terminal device 15. When the base station 10*b* decides to receive the terminal device 15, the base station 10*b* transmits a handover approval (handover ACK) to the base station 10*a* (step S14). In addition to (or instead of) the handover approval message, a handover command or RRC connection reconfiguration message may be transmitted.

When the base station 10*a* receives the handover approval from the base station 10*b*, the base station 10*a* transmits a handover command to the terminal device 15 (step S16). After the base station 10*a* transmits the handover command, the base station 10*a* transfers untransmitted downlink traffic destined for the terminal device 15 to the base station 10*b* which is a target base station (step S22). The base station 10*b* can buffer the transferred downlink traffic (step S24). Here, the buffered downlink traffic is transmitted from the target base station to the terminal device after the handover completion so that seamless handover can be thus realized.

When the terminal device 15 receives the handover command from the base station 10*a*, the terminal device 15 acquires synchronization with the base station 10*b* by searching for a synchronization signal which can be located in the band center of a downlink channel from the base station 10*b* which is the target base station (step S26). The terminal device 15 also acquires system information included in a master information block (MIB), a system information block (SIB), or the like. Then, the terminal device 15 identifies the disposition of the random access channel, for example, by referring to the system information acquired from the SIB and performs random access to the base station 10*b* (step S28). When the random access succeeds, a handover complete and an acknowledgement to the handover complete are exchanged between the terminal device 15 and the base station 10*b* (step S30) and a route update procedure is performed (step S32).

In this way, in the known handover procedure, the source base station performs the handover decision and the target base station performs the admission control. On the other hand, in an environment in which a plurality of cells overlap, in order to prevent harmful interference between the cells, there is a case in which a control node that manages and controls a transmission parameter such as a beam direction or transmission power used by an individual base station or terminal device is introduced into a system. In the present description, the control node is referred to as a cooperation manager. When the cooperation manager is introduced, the quality of a radio channel is affected by interference control. For example, while a gain increases and channel quality is improved in a place to which an antenna beam is oriented, a gain can decrease and the channel quality can deteriorate in another place. The channel quality can deteriorate in a cell in which transmission power from a base station is restricted. However, for example, a source base station does not know which control is performed after handover. Therefore, when a cooperation manager is introduced, there is a possibility of a connection destination cell optimum for a terminal device not being selected in handover decision by the base station.

Accordingly, it is advantageous for a cooperation manager to perform handover decision as in embodiments to be described in detail in subsequent sections. A serving base station transfers a measurement report generated by a terminal device to a cooperation manager in order to cause the cooperation manager to perform handover decision.

<2. Introduction of Cooperation Manager>

In this section, several examples of disposition of a cooperation manager and sequences of corresponding handover procedures will be given with reference to FIGS. 4 to 10C.

(1) First Disposition Scenario

Figure 4:
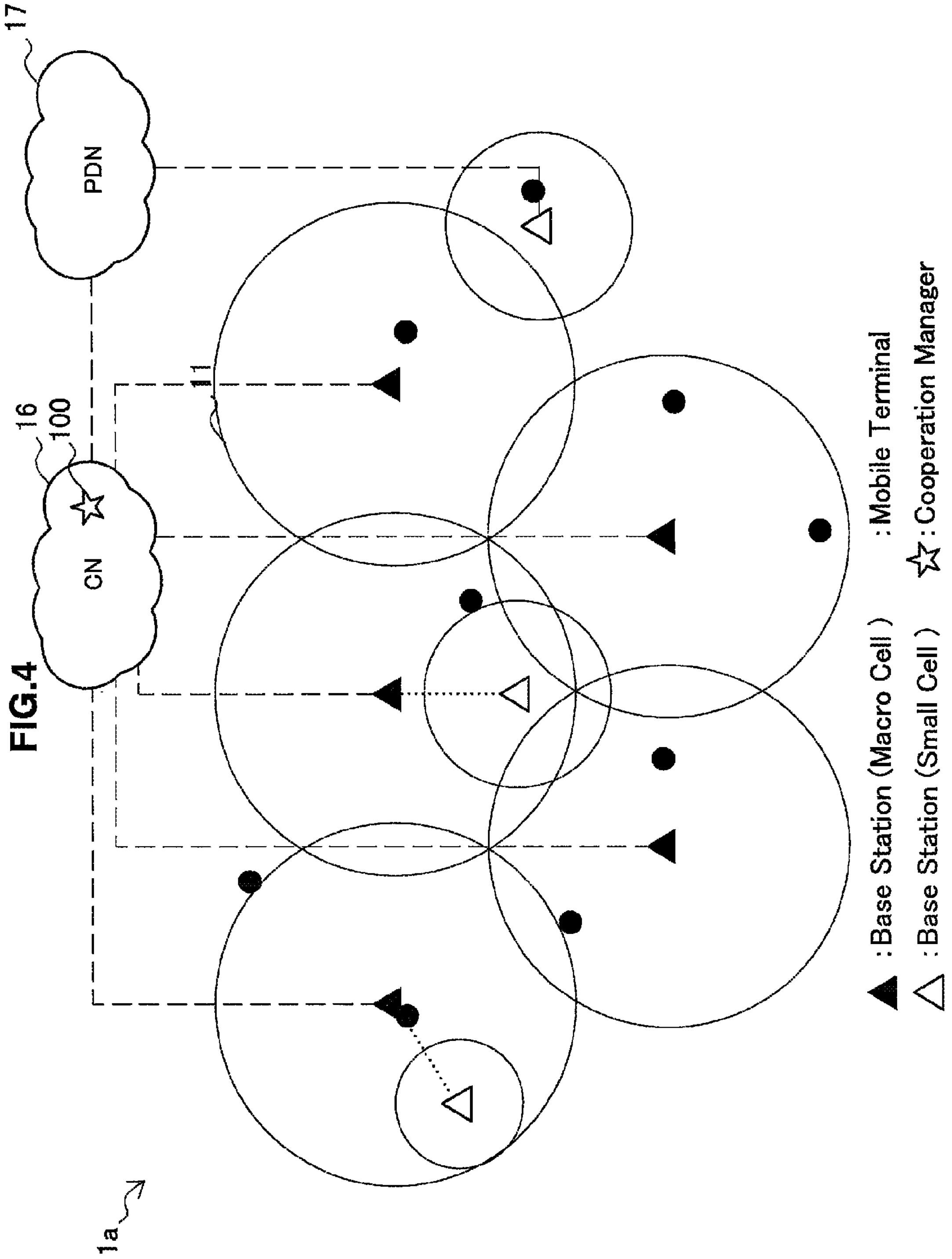
FIG. 4 is an explanatory diagram illustrating a first disposition scenario of a cooperation manager.

FIG. 4 is an explanatory diagram illustrating a first disposition scenario of the cooperation manager. In the first disposition scenario, the cooperation manager is disposed on a different node from the base station. In the example of FIG. 4, in a radio communication system 1*a*, a cooperation manager 100 is disposed in a core network 16. For example, when the core network 16 is an evolved packet core (EPC) in LTE, the cooperation manager 100 may be disposed on any node in an EPC such as a mobility measurement entity (MME), a PDN-gateway (P-GW), or a serving-gateway (S-GW). The cooperation manager 100 may be disposed on a node (for example, an interference control server) in a packet data network 17.

Figure 5A:
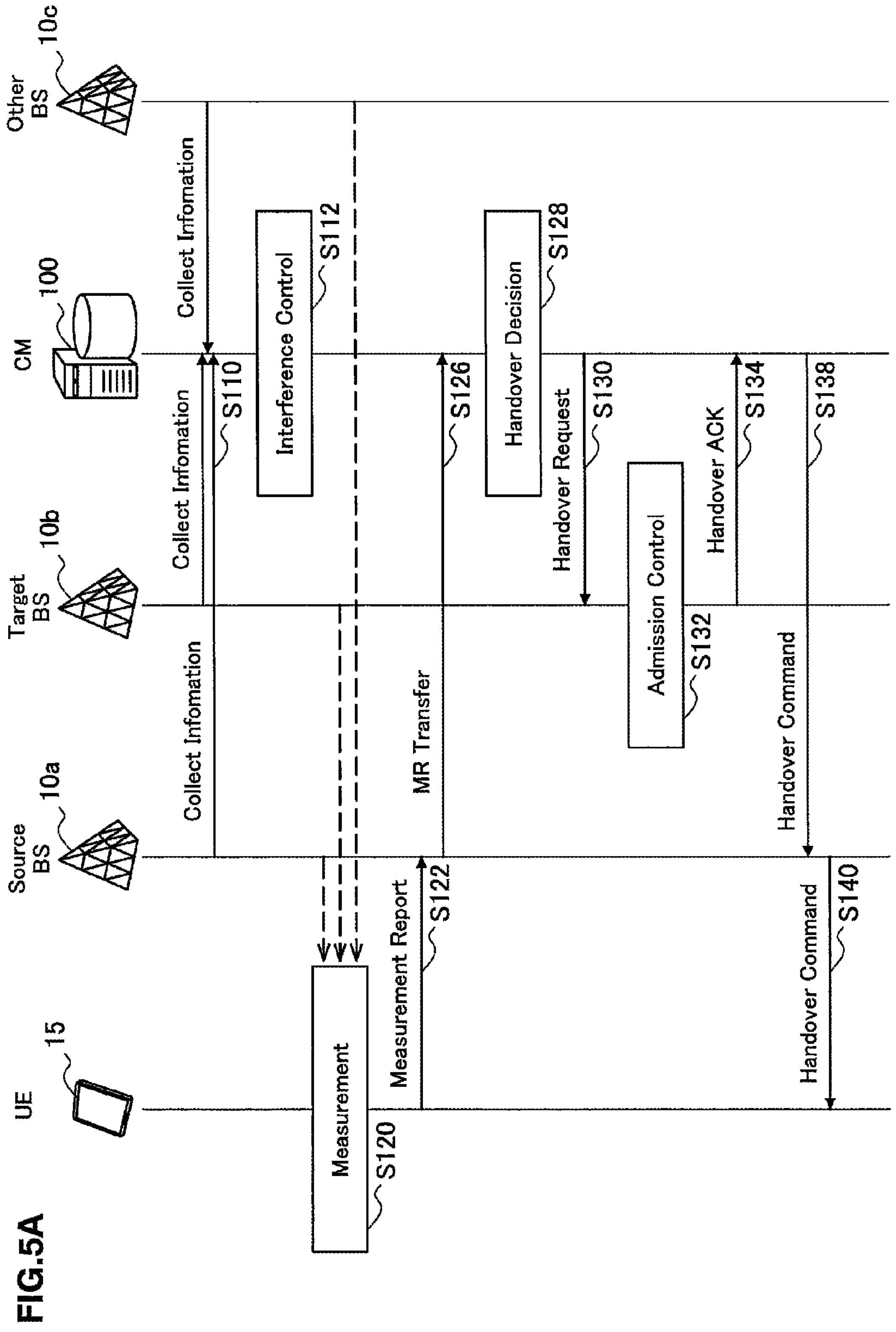
FIG. 5A is a sequence diagram illustrating a first flow example of a communication control process related to the first disposition scenario of FIG. 4.

FIG. 5A is a sequence diagram illustrating a first flow example of a communication control process related to the first disposition scenario of FIG. 4. In the communication control process to be described herein, a terminal device 15, a base station 10*a* which is a source base station, a base station 10*b* which is a target base station, the cooperation manager 100, and another base station 10*c* are assumed to be involved.

Referring to FIG. 5A, the cooperation manager 100 first collects interference control information used for interference control from a plurality of control target base stations (step S110). For example, the interference control information collected herein can include at least one of position information, antenna configuration information, maximum transmission power information, rate control information (modulation and coding schemes or the like), channel quality information, resource assignment information, and communication history information regarding each base station and terminal devices connected to each base station. Each base station may periodically transmit the interference control information to the cooperation manager 100 or may transmit the interference control information to the cooperation manager 100 according to a request from the cooperation manager 100. The interference control information may include identification information (for example, a cell ID) for identifying a cell or a base station of a transmission source of the interference control information. In the interference control information, identification information for identifying an individual terminal apparatus may be deleted or masked from the viewpoint of privacy protection. The format of the interference control information can be defined in advance. The cooperation manager 100 performs interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

When the base station 10*b* is selected as a target base station in the handover decision, the cooperation manager 100 transmits a handover request to the base station 10*b* (step S130). When the base station 10*b* receives the handover request, the base station 10*b* decides whether to receive the terminal device 15 by performing admission control (step S132). Then, when the base station 10*b* decides to receive the terminal device 15, the base station 10*b* transmits handover approval to the cooperation manager 100 (step S134). When the base station 10*b* decides not to receive the terminal device 15, the base station 10*b* can give a response with handover deny to the cooperation manager 100 (or may give no response).

When the cooperation manager 100 receives the handover approval from the base station 10*b*, the cooperation manager 100 transmits a handover command to the base station 10*a* (step S138). When the base station 10*a* receives the handover command from the cooperation manager 100, the base station 10*a* further transmits a handover command to the terminal device 15 (step S140). The subsequent processes may be the same as the processes after the handover command is transmitted to the terminal device in the handover procedure described with reference to FIG. 3.

Figure 5B:
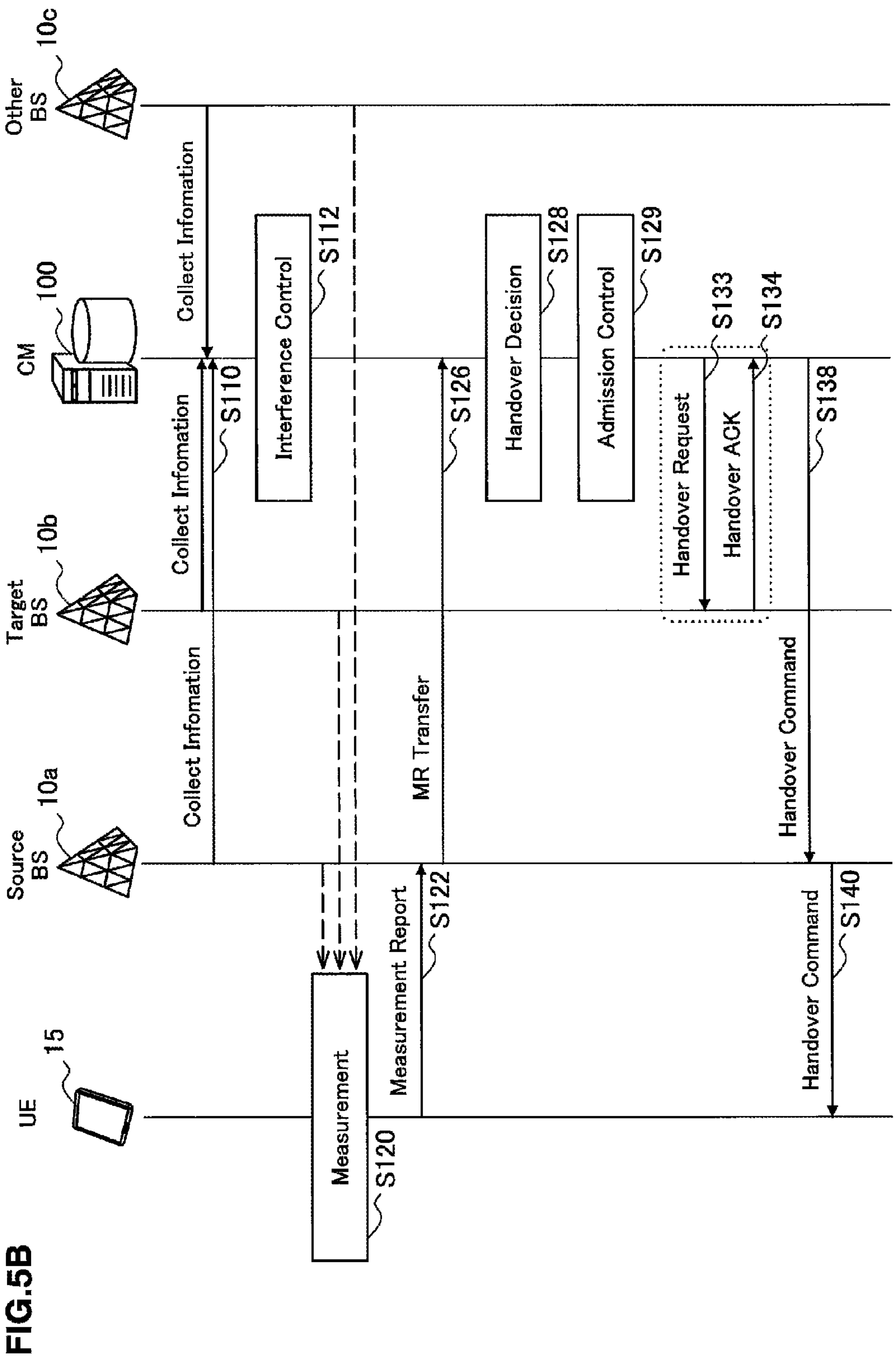
FIG. 5B is a sequence diagram illustrating a second flow example of the communication control process related to the first disposition scenario of FIG. 4.

FIG. 5B is a sequence diagram illustrating a second flow example of a communication control process related to the first disposition scenario of FIG. 4. In the communication control process to be described herein, a terminal device 15, a base station 10*a* which is a source base station, a base station 10*b* which is a target base station, the cooperation manager 100, and another base station 10*c* are assumed to be involved.

Referring to FIG. 5B, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 5B, the cooperation manager 100 also performs admission control instead of the target base station (step S129). Information necessary for the admission control can also be collected in step S110.

The cooperation manager 100 transmits a handover request to the base station 10*b* which is the target base station selected as the result of the handover decision and the admission control (step S133). The base station 10*b* transmits handover approval to the cooperation manager 100 (step S134). The processes of steps S133 and S134 may be omitted. In step S133, a handover order may be transmitted instead of the handover request. In the present description, the handover order is a message meaning that the base station receiving the handover order does not deny the determination of the cooperation manager 100.

Thereafter, the cooperation manager 100 transmits a handover command to the base station 10*a* (step S138). When the base station 10*a* receives the handover command from the cooperation manager 100, the base station 10*a* further transmits a handover command to the terminal device 15 (step S140). The subsequent processes may be the same as the processes after the handover command is transmitted to the terminal device in the handover procedure described with reference to FIG. 3.

(2) Second Disposition Scenario

Figure 6:
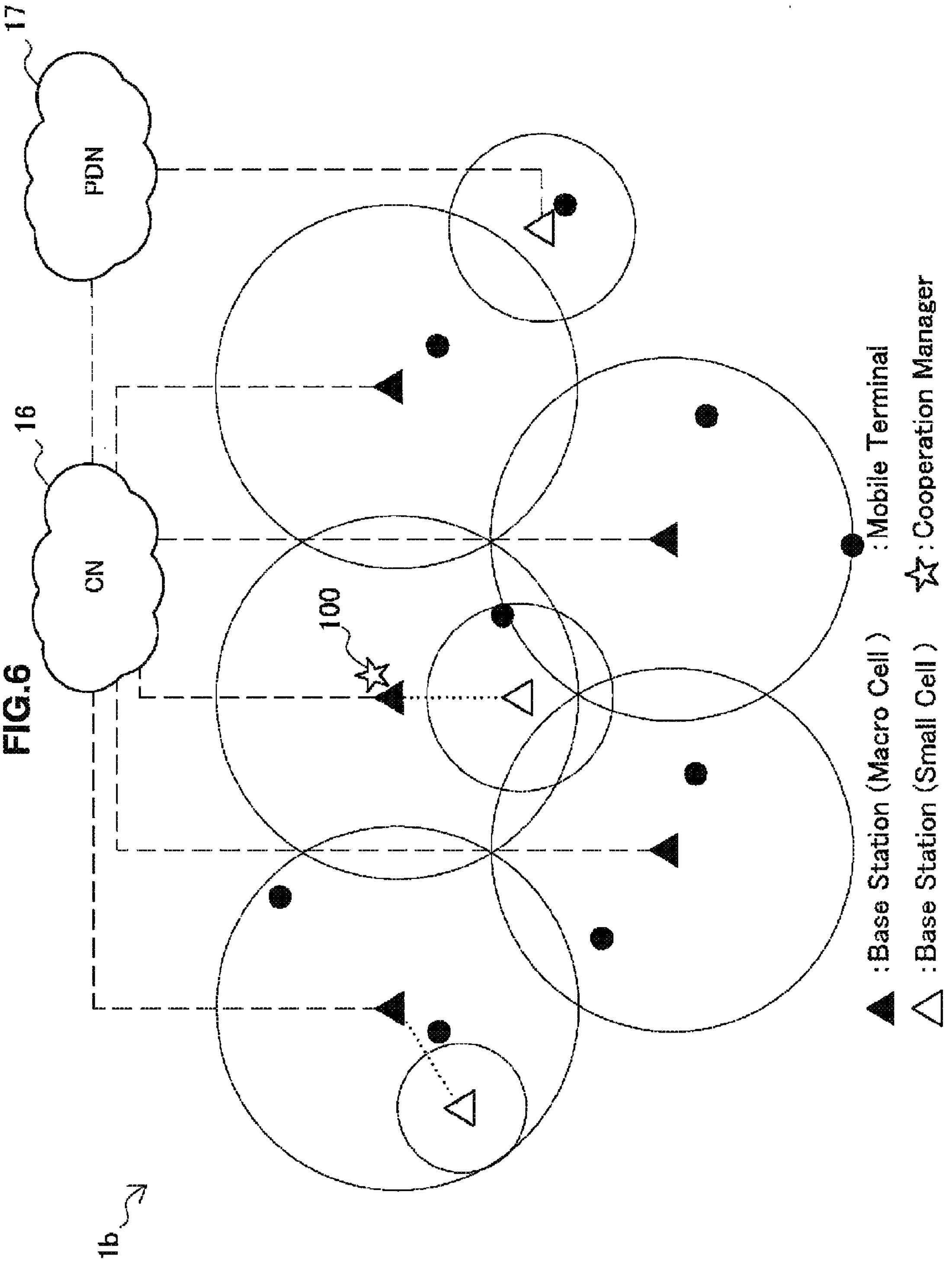
FIG. 6 is an explanatory diagram illustrating a second disposition scenario of the cooperation manager.

FIG. 6 is an explanatory diagram illustrating a second disposition scenario of the cooperation manager. In the second disposition scenario, the cooperation manager is disposed on a base station. In the example of FIG. 6, in a radio communication system 1*b*, one of a plurality of macro cell base stations has a function of the cooperation manager 100. The cooperation manager 100 may be disposed on a small cell base station.

Figure 7A:
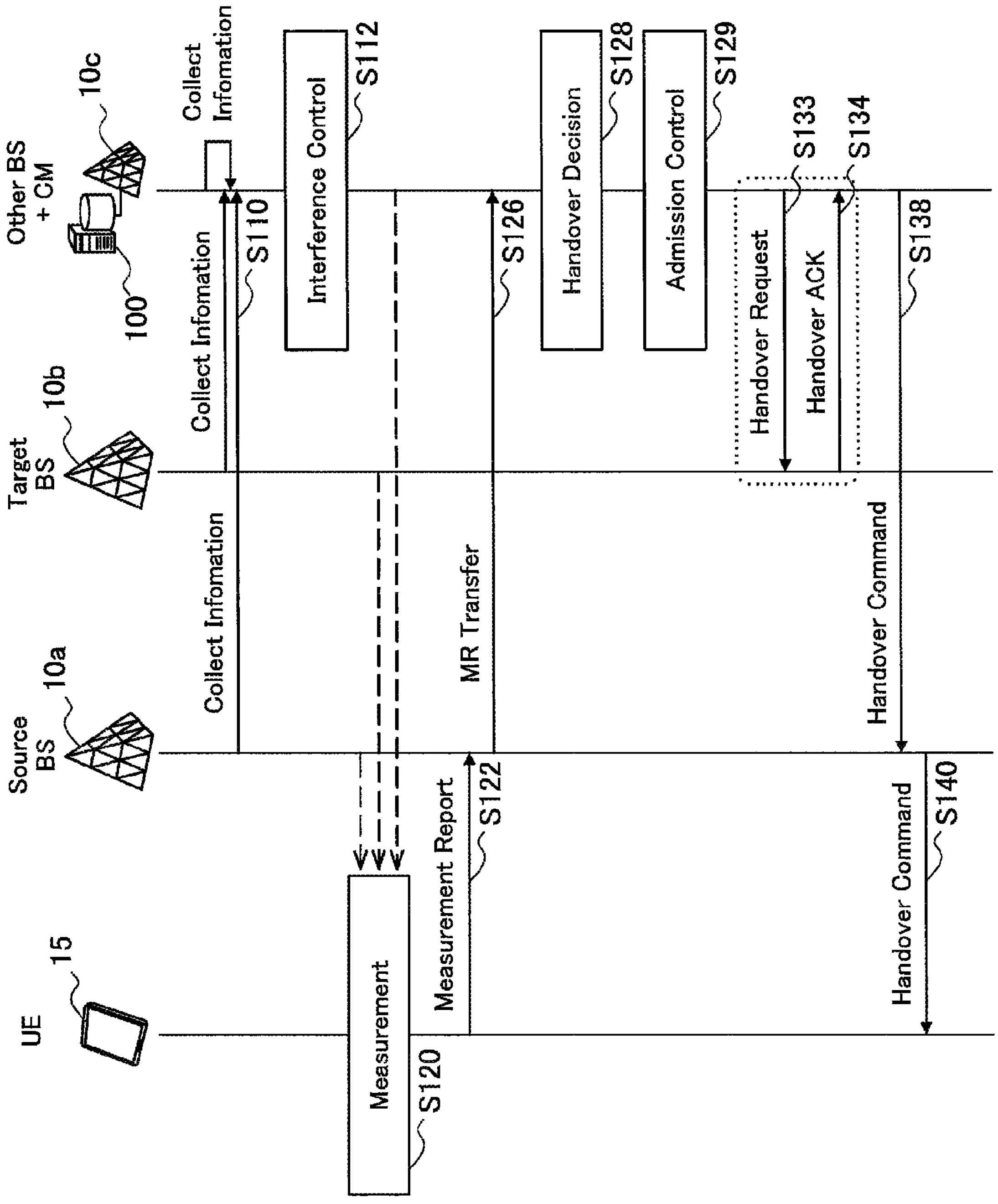
FIG. 7A is a sequence diagram illustrating a first flow example of a communication control process related to the second disposition scenario of FIG. 6.

FIG. 7A is a sequence diagram illustrating a first flow example of a communication control process related to the second disposition scenario of FIG. 6. Here, in the communication control process, the terminal device 15, the base station 10*a* which is a source base station, the base station 10*b* which is a target base station, and another base station 10*c* on which the cooperation manager 100 is mounted are assumed to be involved.

Referring to FIG. 7A, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 7A, the cooperation manager 100 also performs admission control instead of the target base station (step S129). Information necessary for the admission control can also be collected in step S110. As described with reference to FIG. 5A, the admission control may also be performed by the target base station.

The cooperation manager 100 transmits a handover request to the base station 10*b* which is the target base station selected as the result of the handover decision and the admission control (step S133). The base station 10*b* transmits handover approval to the cooperation manager 100 (step S134). The processes of steps S133 and S134 may be omitted. In step S133, a handover order may be transmitted instead of the handover request.

Thereafter, the cooperation manager 100 transmits a handover command to the base station 10*a* (step S138). When the base station 10*a* receives the handover command from the cooperation manager 100, the base station 10*a* further transmits a handover command to the terminal device 15 (step S140). The subsequent processes may be the same as the processes after the handover command is transmitted to the terminal device in the handover procedure described with reference to FIG. 3.

Figure 7B:
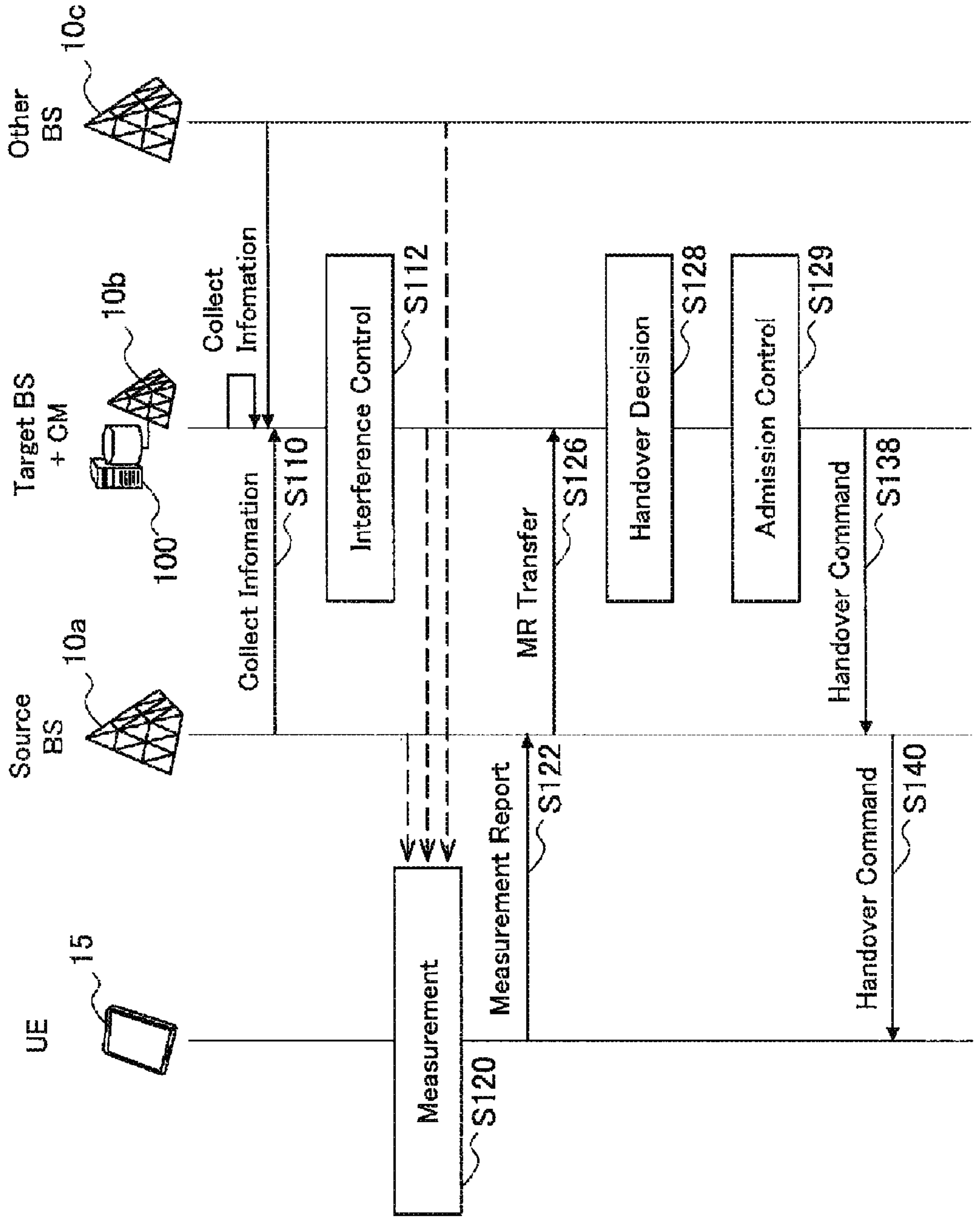
FIG. 7B is a sequence diagram illustrating a second flow example of the communication control process related to the second disposition scenario of FIG. 6.

FIG. 7B is a sequence diagram illustrating a second flow example of the communication control process related to the second disposition scenario of FIG. 6. Here, in the communication control process, the terminal device 15, the base station 10*a* which is a source base station, the base station 10*b* which is a target base station and on which the cooperation manager 100 is mounted, and another base station 10*c* are assumed to be involved.

Referring to FIG. 7B, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

Next, when the base station 10*b* which is also the cooperation manager 100 is selected as the target base station, the base station 10*b* performs the admission control (step S129). Then, when the base station 10*b* decides to receive the terminal device 15 as the result of the admission control, the base station 10*b* transmits a handover command to the base station 10*a* (step S138). When the base station 10*a* receives the handover command from the cooperation manager 100, the base station 10*a* further transmits a handover command to the terminal device 15 (step S140). The subsequent processes may be the same as the processes after the handover command is transmitted to the terminal device in the handover procedure described with reference to FIG. 3.

Figure 7C:
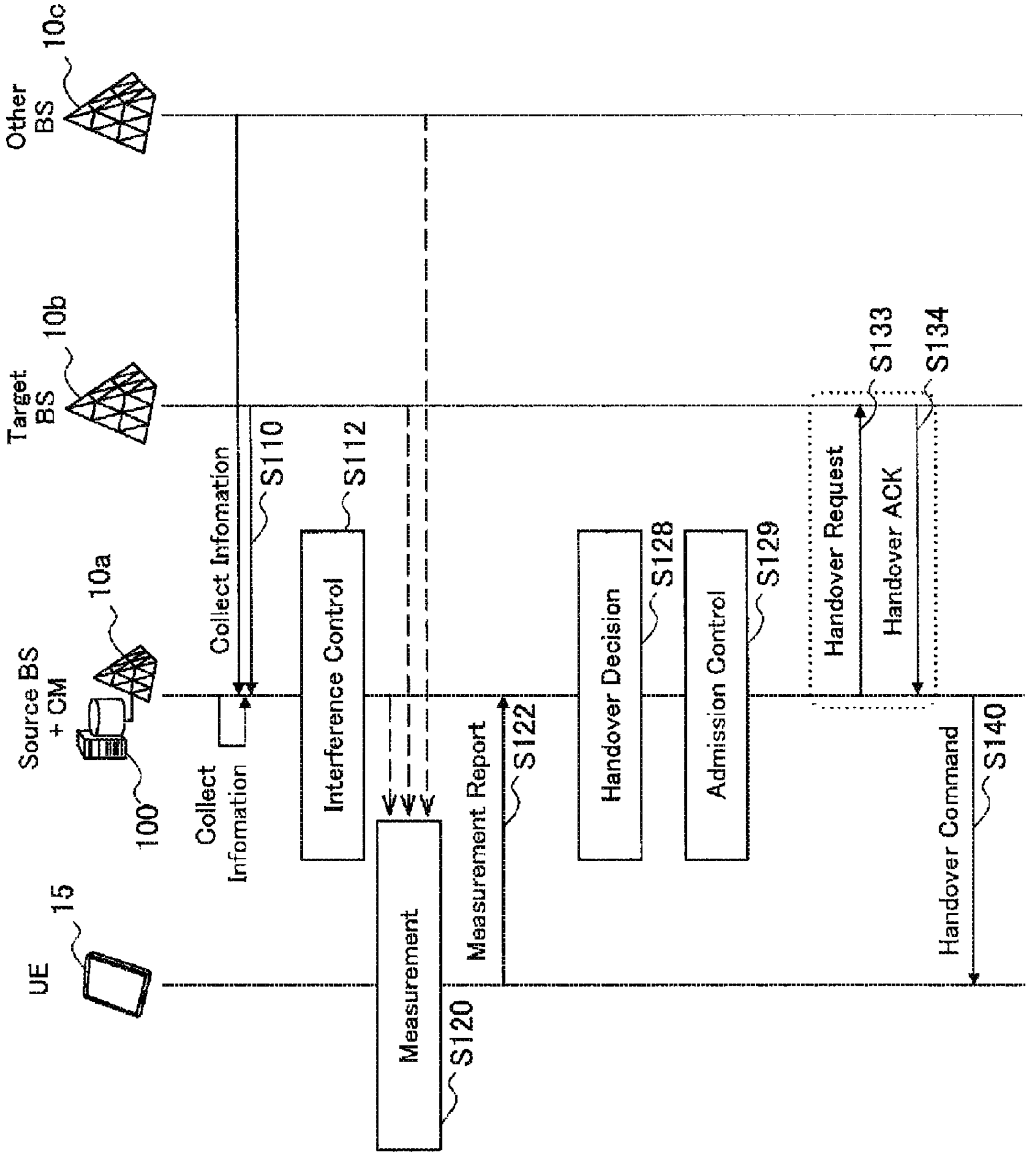
FIG. 7C is a sequence diagram illustrating a third flow example of the communication control process related to the second disposition scenario of FIG. 6.

FIG. 7C is a sequence diagram illustrating a third flow example of the communication control process related to the second disposition scenario of FIG. 6. Here, in the communication control process, the terminal device 15, the base station 10*a* which is a source base station and on which the cooperation manager 100 is mounted, the base station 10*b* which is a target base station, and another base station 10*c* are assumed to be involved.

Referring to FIG. 7C, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* which is also the cooperation manager 100 receives a measurement report generated by the terminal device 15, the base station 10*a* performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 7C, the cooperation manager 100 also performs admission control instead of the target base station (step S129). Information necessary for the admission control can also be collected in step S110. As described with reference to FIG. 5A, the admission control may also be performed by the target base station.

The cooperation manager 100 transmits a handover request to the base station 10*b* which is the target base station selected as the result of the handover decision and the admission control (step S133). The base station 10*b* transmits handover approval to the cooperation manager 100 (step S134). The processes of steps S133 and S134 may be omitted. In step S133, a handover order may be transmitted instead of the handover request.

Thereafter, the cooperation manager 100 transmits the handover command to the terminal device 15 (step S140). The subsequent processes may be the same as the processes after the handover command is transmitted to the terminal device in the handover procedure described with reference to FIG. 3.

(3) Involvement of Base Station Other than Control Target

When the base station not included as an interference control target is involved in the handover procedure as the source base station or the target base station in both of the first disposition scenario and the second disposition scenario of the cooperation manager, the sequence of the communication control process partially differs from the above-described sequence.

Figure 8A:
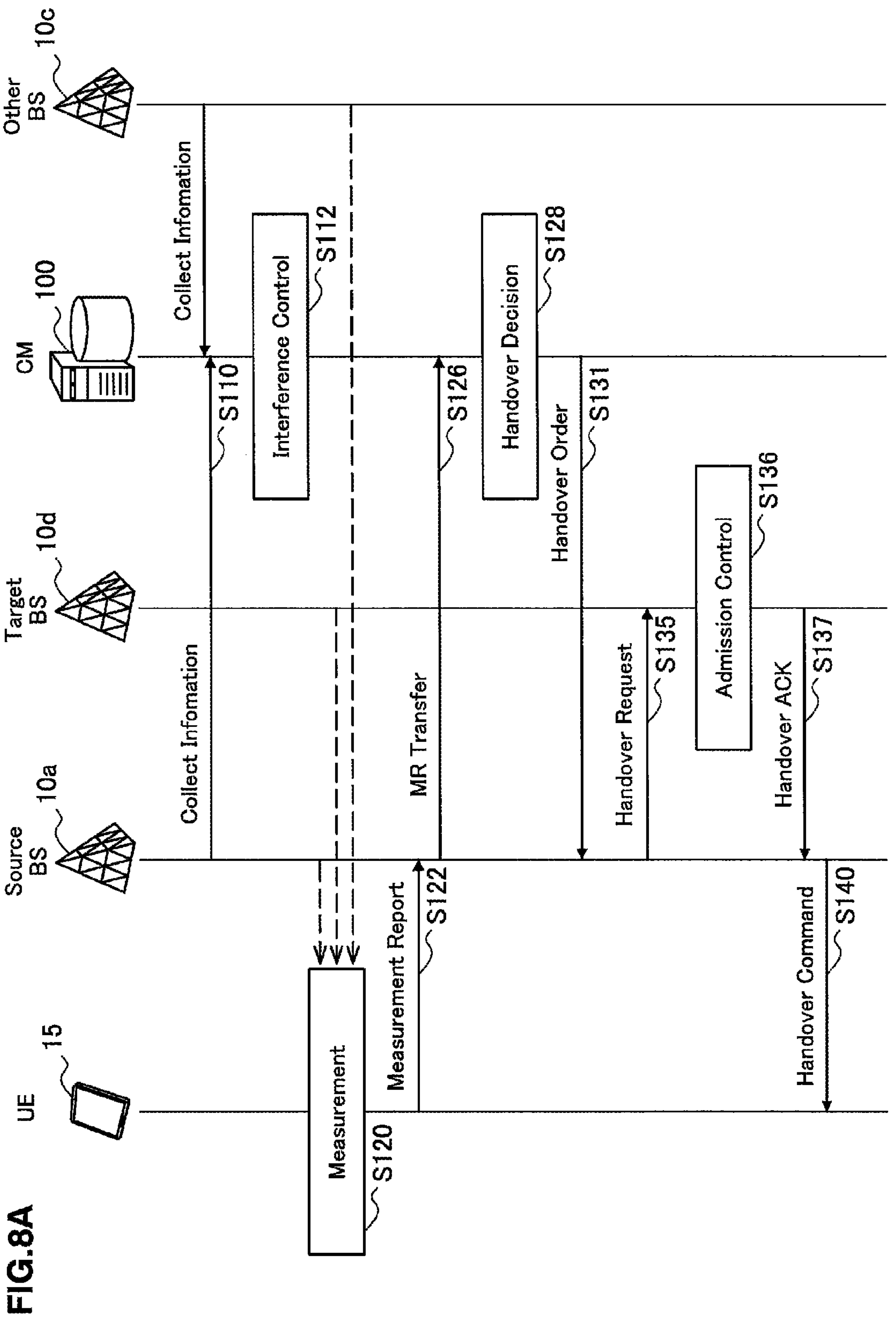
FIG. 8A is a sequence diagram illustrating a flow example of a communication control process when a target base station is a base station other than a control target.

FIG. 8A is a sequence diagram illustrating a flow example of a communication control process when a target base station is a base station other than a control target. The terminal device 15, the base station 10*a* which is a source base station, a base station 10*d* which is a target base station, the cooperation manager 100, and another base station 10*c* are involved in the communication control process described herein. The base station 10*d* is not included as a control target of the interference control by the cooperation manager 100. The base station 10*d* may be a macro cell base station or a small cell base station.

Referring to FIG. 8A, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

When the cooperation manager 100 selects the base station 10*d* as the target base station in the handover decision, the cooperation manager 100 transmits a handover order to the base station 10*a* (step S131). The handover order includes identification information for identifying the base station 10*d* as the target base station. When the base station 10*a* receives the handover order, the base station 10*a* transmits a handover request to the base station 10*d* (step S135). When the base station 10*d* receives the handover request, the base station 10*d* decides whether to receive the terminal device 15 by performing admission control (step S136). Then, when the base station 10*d* decides to receive the terminal device 15, the base station 10*d* transmits handover approval to the base station 10*a* (step S137). When the base station 10*d* decides not to receive the terminal device 15, the base station 10*d* can give a response with handover deny to the base station 10*a*.

When the base station 10*a* receives handover approval from the base station 10*d*, the base station 10*a* transmits a handover command to the terminal device 15 (step S140). The subsequent processes may be the same as the processes after the handover command is transmitted to the terminal device in the handover procedure described with reference to FIG. 3.

Figure 8B:
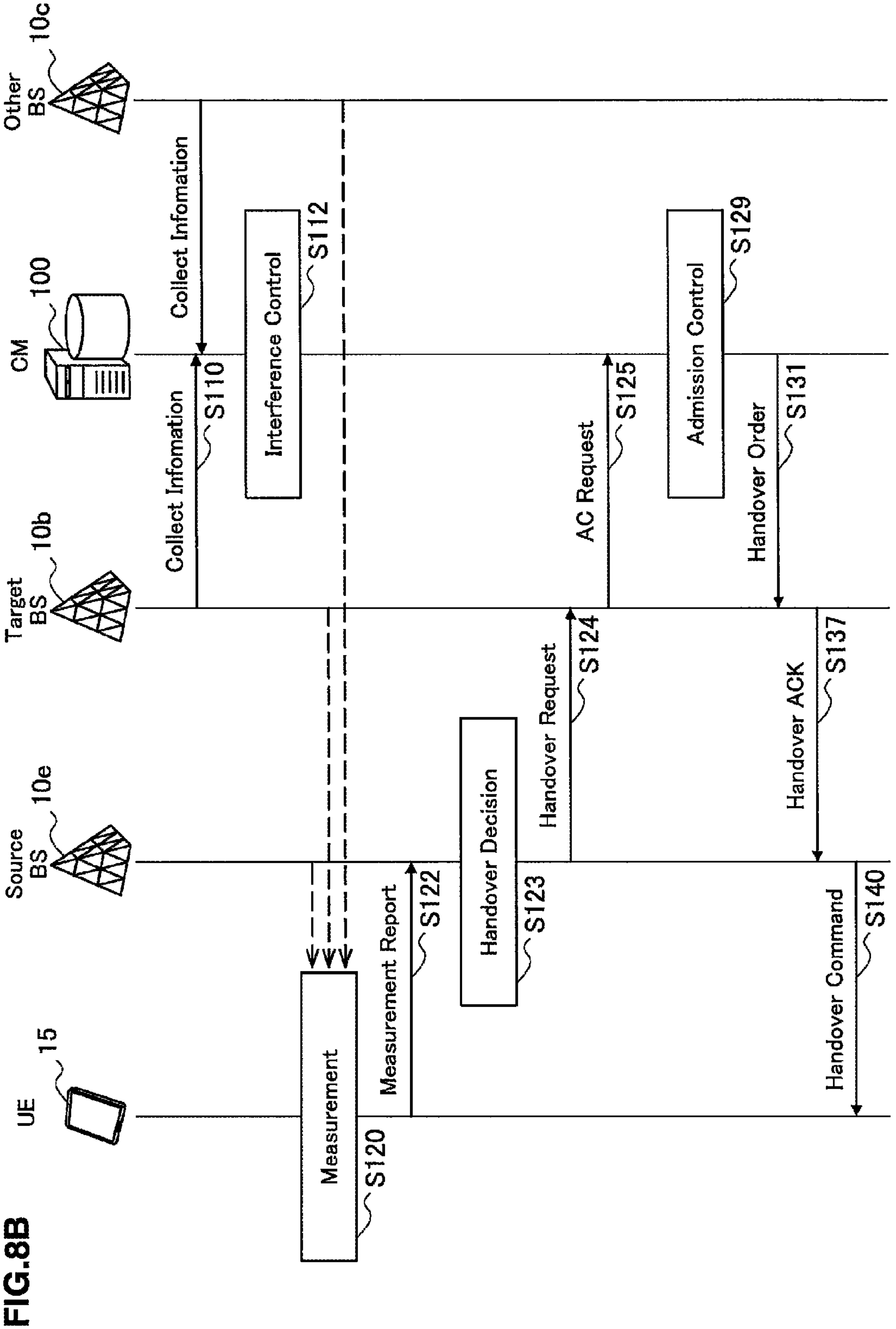
FIG. 8B is a sequence diagram illustrating a flow example of a communication control process when a source base station is a source base station other than a control target.

FIG. 8B is a sequence diagram illustrating a flow example of a communication control process when a source base station is a base station other than a control target. The terminal device 15, the base station 10*e* which is a source base station, a base station 10*b* which is a target base station, the cooperation manager 100, and another base station 10*c* are involved in the communication control process described herein. The base station 10*e* is not included as a control target of the interference control by the cooperation manager 100. The base station 10*e* may be a macro cell base station or a small cell base station.

Referring to FIG. 8B, the cooperation manager 100 first collects interference control information used for interference control from a plurality of control target base stations (step S110). Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*e* which is the serving base station (step S122).

When the base station 10*e* receives the measurement report generated by the terminal device 15, the base station 10*e* performs the handover decision (step S123). Here, in the handover decision, the base station 10*e* uses the decision index included in the measurement report. When the base station 10*b* is selected as the target base station in the handover decision, the base station 10*e* transmits a handover request to the base station 10*b* (step S124).

When the base station 10*b* receives the handover request from the base station 10*e*, the base station 10*b* transmits an admission control request to the cooperation manager 100 (step S125). When the cooperation manager receives the admission control request from the base station 10*b*, the cooperation manager performs the admission control instead of the base station 10*b* selected as the target base station (step S129). Then, when the cooperation manager 100 decides that the base station 10*b* receives the terminal device 15 as the result of the admission control, the cooperation manager 100 returns the handover order to the base station 10*b* (step S131).

When the base station 10*b* receives the handover order from the cooperation manager 100, the base station 10*b* returns the handover approval to the base station 10*e* (step S137). When the base station 10*e* receives the handover approval from the base station 10*b*, the base station 10*e* transmits the handover command to the terminal device 15 (step S140). The subsequent processes may be the same as the processes after the handover command is transmitted to the terminal device in the handover procedure described with reference to FIG. 3.

The exchange of messages between the cooperation manager 100 and the base station and the exchange of messages between the base stations may be performed via any intermediate node. For example, exchange of messages among a small-sized base station installed by a user, another base station, and the cooperation manager 100 can be performed via a gateway device (not illustrated) of a home network of the user.

(4) Control of Localized Network

In a handover procedure of a slave terminal connected to a master terminal forming a localized network, a sequence of a communication control process partially differs from the above-described sequences.

Figure 9A:
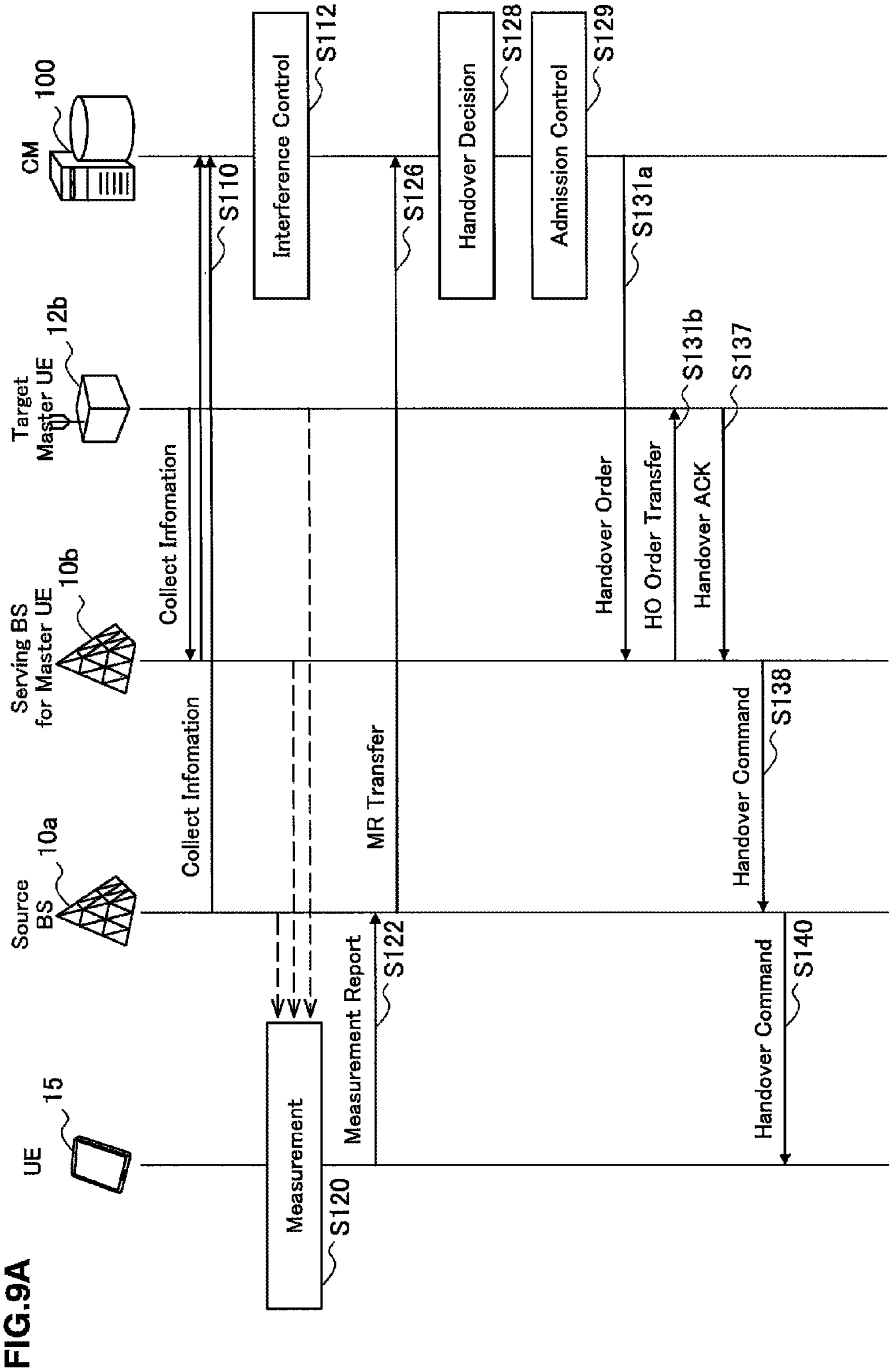
FIG. 9A is a sequence diagram illustrating a first flow example of a communication control process related to control of a localized network.

FIG. 9A is a sequence diagram illustrating a first flow example of a communication control process related to control of a localized network. Here, the terminal device 15, the base station 10*a* which is a source base station, a master terminal 12*b* which is a target base station, a base station 10*b* which is a serving base station of the master terminal 12*b*, and the cooperation manager 100 are assumed to be involved in the communication control process.

Referring to FIG. 9A, the cooperation manager 100 first collects interference control information used for interference control from a plurality of control target base stations (step S110). The base station 10*b* relays interference control information of the master terminal 12*b* to the cooperation manager 100. Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the base station 10*a* which is the serving base station (step S122).

When the base station 10*a* receives the measurement report generated by the terminal device 15, the base station 10*a* transfers the received measurement report to the cooperation manager 100 performing handover decision (step S126).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 9A, the cooperation manager 100 also performs admission control instead of the target base station (step S129). Information necessary for the admission control can also be collected in step S110. The admission control may also be performed by the target base station.

Then, the cooperation manager 100 transmits a handover order destined for the master terminal 12*b* which is the target base station selected as the result of the handover decision and the admission control to the base station 10*b* (step S131*a*). The base station 10*b* transfers the handover order received from the cooperation manager 100 to the master terminal 12*b* (step S131*b*). When the master terminal 12*b* receives the transferred handover order, the master terminal 12*b* returns the handover approval to the base station 10*b* (step S137). The processes of steps S131*a* to 137 may be omitted and the handover command or the handover order may be transmitted directly from the cooperation manager 100 to the base station 10*a*.

When the base station 10*b* receives the handover approval from the master terminal 12*b*, the base station 10*b* transmits the handover command to the base station 10*a* (step S138). When the base station 10*a* receives the handover command from the base station 10*b*, the base station 10*a* further transmits the handover command to the terminal device 15 (step S140). The subsequent processes may be the same as the processes after the handover command is transmitted to the terminal device in the handover procedure described with reference to FIG. 3.

Figure 9B:
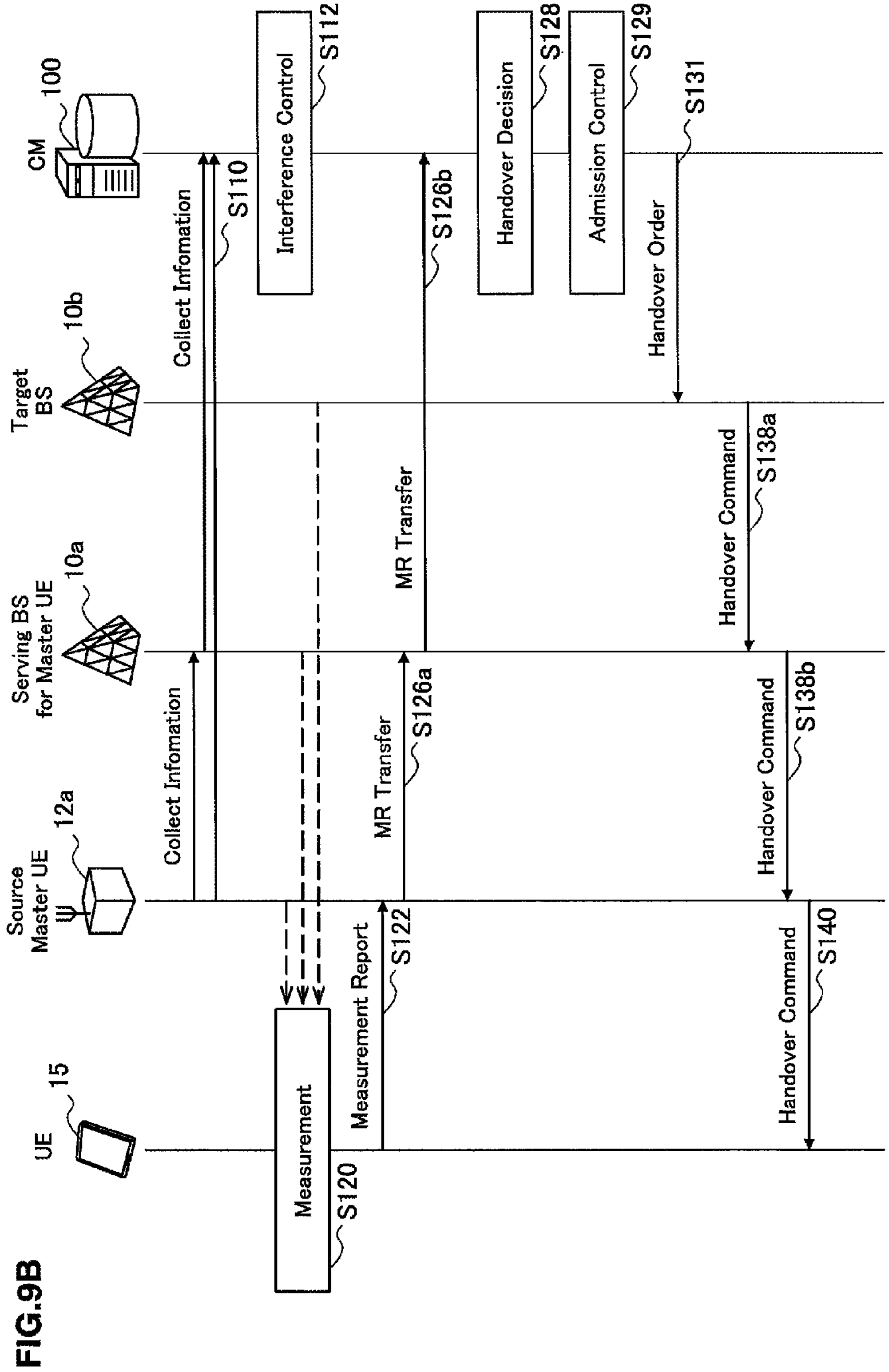
FIG. 9B is a sequence diagram illustrating a second flow example of the communication control process related to the control of the localized network.

FIG. 9B is a sequence diagram illustrating a second flow example of the communication control process related to the control of the localized network. Here, the terminal device 15, a master terminal 12*a* which is a source base station, a base station 10*a* which is a serving base station of the master terminal 12*a*, a base station 10*b* which is a target base station, and the cooperation manager 100 are assumed to be involved in the communication control process.

Referring to FIG. 9B, the cooperation manager 100 first collects interference control information used for interference control from a plurality of control target base stations (step S110). The base station 10*a* relays interference control information of the master terminal 12*a* to the cooperation manager 100. Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the master terminal 12*a* which is the serving base station (step S122).

The master terminal 12*a* transfers the measurement report generated by the terminal device 15 to the base station 10*a* (step S126*a*). When the base station 10*a* receives the measurement report from the master terminal 12*a*, the base station 10*a* transfers the received measurement report to the cooperation manager 100 performing the handover decision (step S126*b*).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 9B, the cooperation manager 100 also performs admission control instead of the target base station (step S129). Information necessary for the admission control can also be collected in step S110. The admission control may also be performed by the target base station.

Then, the cooperation manager 100 transmits a handover order to the base station 10*b* which is the target base station selected as the result of the handover decision and the admission control (step S131).

When the base station 10*b* receives the handover order from the cooperation manager 100, the base station 10*b* transmits the handover command destined for the master terminal 12*a* to the base station 10*a* (step S138*a*). The base station 10*a* transfers the handover command received from the cooperation manager 100 to the master terminal 12*a* (step S138*b*). When the master terminal 12*a* receives the handover command from the base station 10*a*, the master terminal 12*a* transmits the handover command to the terminal device 15 (step S140). The subsequent processes may be the same as the processes after the handover command is transmitted to the terminal device in the handover procedure described with reference to FIG. 3. The master terminal 12*a* may have a function of transferring downlink traffic having arrived after the handover command to the target base station. Instead, the base station 10*a* which is a serving base station of the master terminal 12*a* may transfer the downlink traffic to the target base station.

Figure 9C:
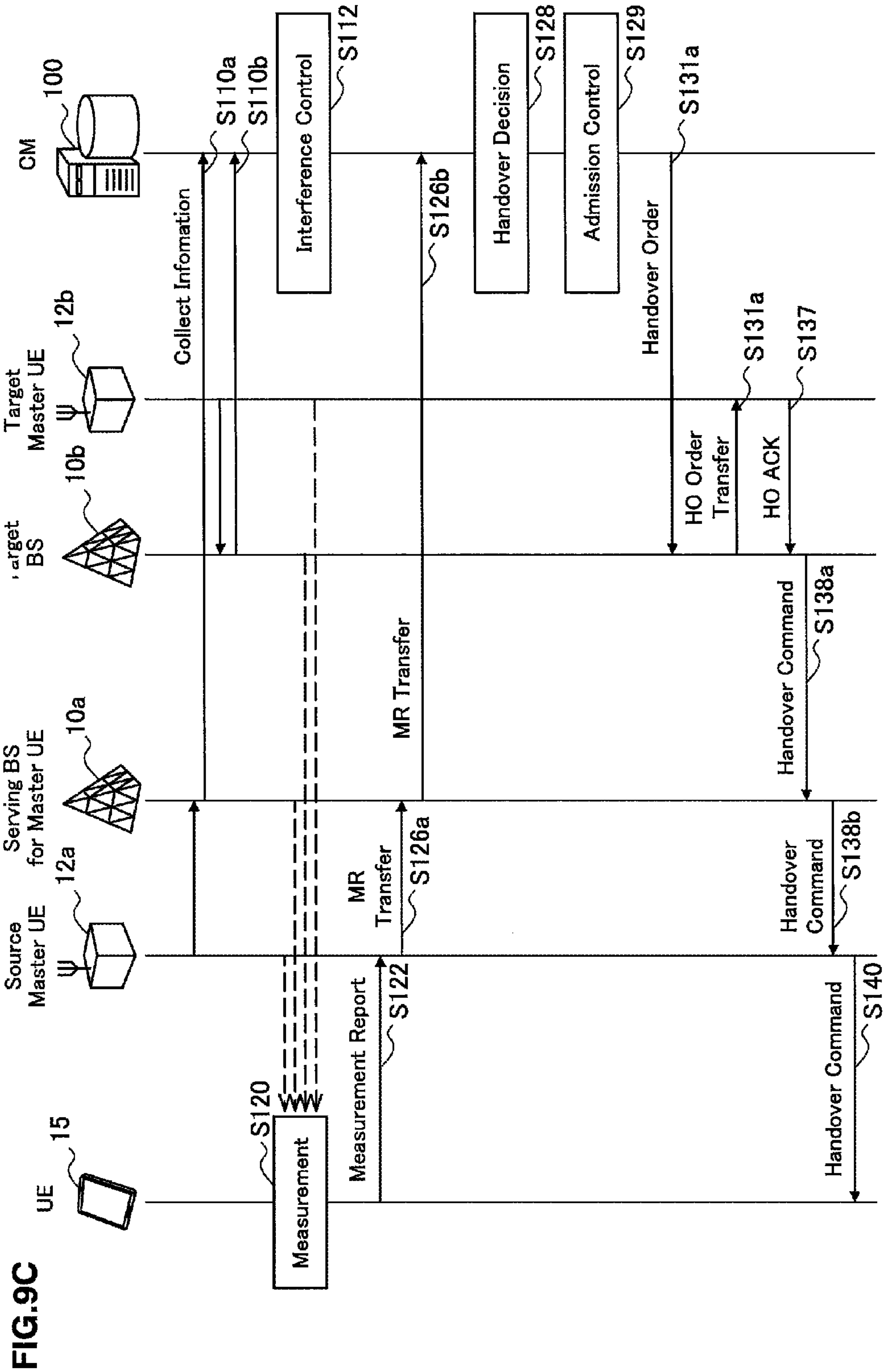
FIG. 9C is a sequence diagram illustrating a third flow example of the communication control process related to the control of the localized network.

FIG. 9C is a sequence diagram illustrating a third flow example of the communication control process related to the control of the localized network. Here, the terminal device 15, the master terminal 12*a* which is a source base station, the base station 10*a* which is a serving base station of the master terminal 12*a*, a master terminal 12*b* which is a target base station, the base station 10*b* which is a serving base station of the master terminal 12*b*, and the cooperation manager 100 are assumed to be involved in the communication control process.

Referring to FIG. 9C, the cooperation manager 100 first collects interference control information used for interference control from a plurality of control target base stations (step S110). The base station 10*a* relays interference control information of the master terminal 12*a* to the cooperation manager 100. The base station 10*b* relays interference control information of the master terminal 12*b* to the cooperation manager 100. Then, the cooperation manager 100 performs the interference control based on the collected interference control information (step S112). A specific example of the interference control performed herein will be further described below.

On the other hand, the terminal device 15 receives a reference signal transmitted from a serving base station and at least one peripheral base station and performs measurement (step S120). Then, the terminal device 15 transmits a measurement report including a determination index indicating a measurement result to the master terminal 12*a* which is the serving base station (step S122).

The master terminal 12*a* transfers the measurement report generated by the terminal device 15 to the base station 10*a* (step S126*a*). When the base station 10*a* receives the measurement report from the master terminal 12*a*, the base station 10*a* transfers the received measurement report to the cooperation manager 100 performing the handover decision (step S126*b*).

When the cooperation manager 100 receives the transferred measurement report, the cooperation manager 100 performs the handover decision (step S128). Here, in the handover decision, the cooperation manager 100 uses a decision index corrected by factoring in an influence of interference control instead of using the decision index included in the measurement report without change. A specific example of the correction of the decision index herein will be further described below.

In the example of FIG. 9C, the cooperation manager 100 also performs admission control instead of the target base station (step S129). Information necessary for the admission control can also be collected in step S110. The admission control may also be performed by the target base station.

Then, the cooperation manager 100 transmits a handover order destined for the master terminal 12*b* which is the target base station selected as the result of the handover decision and the admission control to the base station 10*b* (step S131*a*). The base station 10*b* transfers the handover order received from the cooperation manager 100 to the master terminal 12*b* (step S131*b*). When the master terminal 12*b* receives the transferred handover order, the master terminal 12*b* returns the handover approval to the base station 10*b* (step S137). The processes of steps S131*a* to 137 may be omitted and the handover command or the handover order destined for the master terminal 12*a* may be transmitted from the cooperation manager 100 to the base station 10*a*.

When the base station 10*b* receives the handover approval from the master terminal 12*b*, the base station 10*b* transmits the handover command destined for the master terminal 12*a* to the base station 10*a* (step S138*a*). The base station 10*a* transfers the handover command received from the base station 10*b* to the master terminal 12*a* (step S138*b*). When the master terminal 12*a* receives the handover command from the base station 10*a*, the master terminal 12*a* transmits the handover command to the terminal device 15 (step S140). The subsequent processes may be the same as the processes after the handover command is transmitted to the terminal device in the handover procedure described with reference to FIG. 3.

In FIGS. 8A to 9C, the examples in which a cooperation manager is disposed on a different node from the base station as in the first disposition scenario illustrated in FIG. 4 have been described, but the sequence of each diagram can also be applied to the second disposition scenario in which the cooperation manager is disposed on any base station.

In a subsequent section, an example of the detailed configuration of the cooperation manager 100 performing the communication control process exemplified above will be described.

<3. Configuration Example of Cooperation Manager>

[3-1. Configuration Example of Device]

Figure 10:
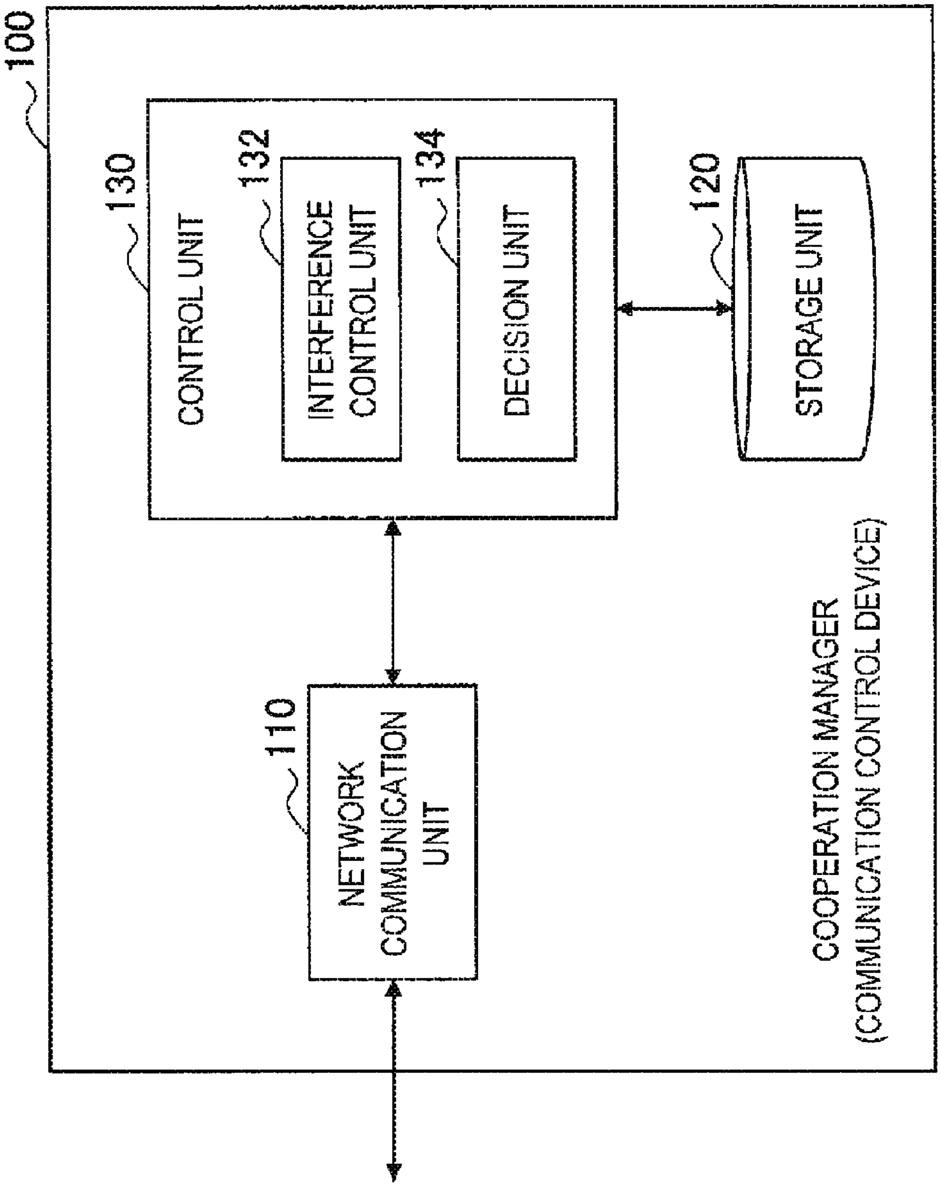
FIG. 10 is a block diagram illustrating a configuration example of a cooperation manager according to an embodiment.

FIG. 10 is a block diagram illustrating an example of the configuration of the cooperation manager 100. Referring to FIG. 10, the cooperation manager 100 includes a network communication unit 110, a storage unit 120, and a control unit 130. When the cooperation manager 100 is disposed on a base station, the cooperation manager 100 further includes a radio communication unit that performs radio communication with at least one terminal device and a communication control unit that controls the radio communication (none of which is illustrated).

(1) Network Communication Unit

The network communication unit 110 is a communication interface that is connected to a plurality of control target base stations. For example, the network communication unit 110 receives the above-exemplified interference control information from each of the control target base stations. The network communication unit 110 transmits the interference control message for notifying each base station of the transmission parameter determined as the result of the interference control to each base station. The network communication unit 110 receives the measurement report generated by the terminal device and transferred by a serving base station of the terminal device from the serving base station. The network communication unit 110 transmits a handover control message such as the handover request or the handover order to the base station in the handover procedure.

(2) Storage Unit

The storage unit 120 stores a program and data for operating the cooperation manager 100 using a storage medium such as a hard disk or a semiconductor memory. The data stored in the storage unit 120 can include, for example, interference control information received from each of the control target base stations and a transmission parameter determined as the result of the interference control. The data is referred to at the time of handover decision to be described below. When the cooperation manager 100 performs the admission control, the storage unit 120 can also store information for the admission control.

(3) Control Unit

The control unit 130 controls overall operations of the cooperation manager 100 using a processor such as a central processing unit (CPU) or a digital signal processor (DSP). In the example of FIG. 10, the control unit 130 includes an interference control unit 132 and a decision unit 134.

(3-1) Interference Control Unit

The interference control unit 132 performs interference control for the radio communication system including a plurality of base stations and a plurality of terminal devices. As one example, the interference control unit 132 may avoid occurrence of interference in the system by controlling an antenna beam of at least one base station or at least one terminal device. More specifically, for example, the interference control unit 132 collects the interference control information from each of the control target base stations via the network communication unit 110. The interference control information can include position information and antenna configuration information regarding each base station and the terminal device connected to each base station. The antenna configuration information can include information for identifying the number of antennas and an available beam pattern. The interference control unit 132 determines a beam pattern of an antenna beam to be used by each base station based on the collected position information so that the antenna beam cannot be oriented to a potential interfered node (for example, a terminal device connected to a peripheral cell). The interference control unit 132 notifies each base station of the determined beam pattern to be used by transmitting an interference control message via the network communication unit 110.

As another example, the interference control unit 132 may avoid occurrence of interference in the system by controlling transmission power of at least one base station or at least one terminal device. More specifically, for example, the interference control unit 132 collects interference control information from each of the control target base stations via the network communication unit 110. The interference control information can include position information and maximum transmission power information regarding each base station and the terminal device connected to each base station. The interference control unit 132 determines the transmission power to be used by each base station based on the collected position information so that a transmitted radio signal is not received at a level exceeding an allowable level in a potential interfered node. The interference control unit 132 notifies each base station of the determined transmission power to be used by transmitting an interference control message via the network communication unit 110. The interference control unit 132 may perform both of the antenna beam control and the transmission power control described above.

(3-2) Decision Unit

The decision unit 134 performs handover decision on the terminal device instead of the serving base station of each terminal device. When the decision unit 134 performs the handover decision, the decision unit 134 corrects by factoring in an influence of the interference control performed by the interference control unit 132 after the decision index based on the measurement report generated by a terminal device is managed by the terminal device, and then uses the corrected decision index. The measurement report is typically transferred to the cooperation manager 100 by the serving base station of each terminal device.

(3-2-1) Handover Decision Based on RSRP

For example, when reference signal received power (RSRP) is used as the decision index, the decision unit 134 can correct the decision index RSRPs for the serving cell and the decision index $RSRP_{Ti}$ for an i-th peripheral cell as in the following formulae (2) and (3).

[Math 2]

$$RSRP_S' = RSRP_S + G_S \quad (2)$$

$$RSRP_{Ti}' = RSRP_{Ti} + G_{Ti} \quad (3)$$

In formula (2), the $RSRP_S'$ is reference signal received power corrected for the serving cell and $G_S$ is a corrected term for the serving cell. In formula (3), the $RSRP_{Ti}'$ is corrected reference signal received power for the i-th peripheral cell and $G_{Ti}$ is a corrected term for the i-th peripheral cell. Here, formulae (2) and (3) indicate that these corrected terms are offset values applied to the RSRP. A decision formula for decide that the base station of the i-th peripheral cell performs handover as the target base station can be expressed as follows.

[Math 3]

$$RSRP_{Ti}' + a_{Ti} > RSRP_S' + a_S + b_S \quad (4)$$

For a j-th user $U_j$, for example, the corrected terms $G_S$ and $G_{Ti}$ may be terms indicating an assumed influence of control of an antenna beam as in the following formulae (5) and (6).

[Math 4]

$$G_S = dG(\theta_{S,Uj}, \phi_{S,Uj}, r_{S,Uj}) \quad (5)$$

$$G_{Ti} = dG(\theta_{Ti,Uj}, \phi_{Ti,Uj}, r_{Ti,Uj}) \quad (6)$$

Here, functions dG( . . . ) on the right sides of formulae (5) and (6) are functions that have an azimuth angle and an elevation or depression angle of a direction oriented from a base station to a terminal device and a distance from the base station to the terminal device as factors, and a variation amount of a beam steering gain is set as a return value. At least one factor of the functions dG may be omitted.

Figure 11A:
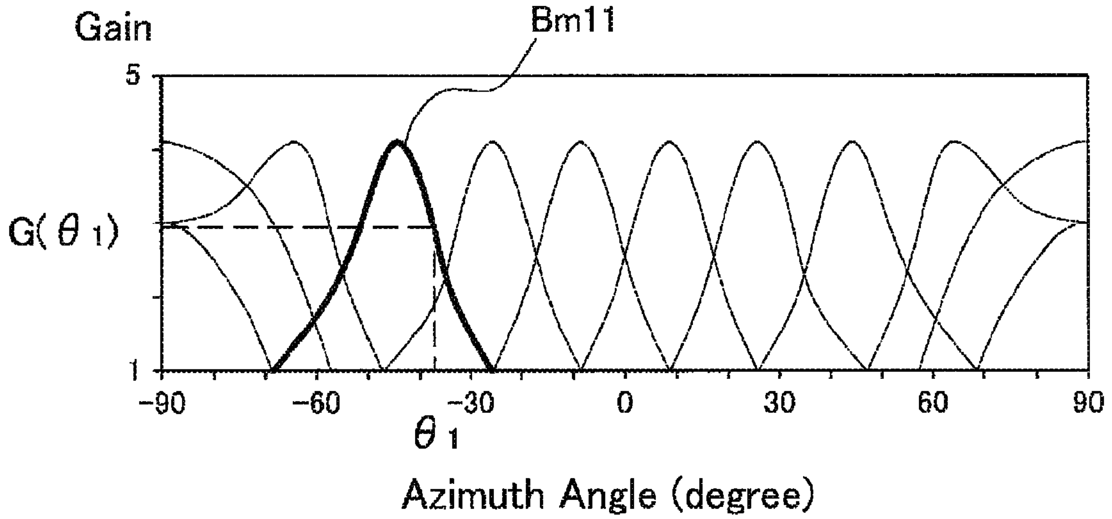
FIG. 11A is a first explanatory diagram illustrating correction terms indicating an influence of control of an antenna beam.
Figure 11B:
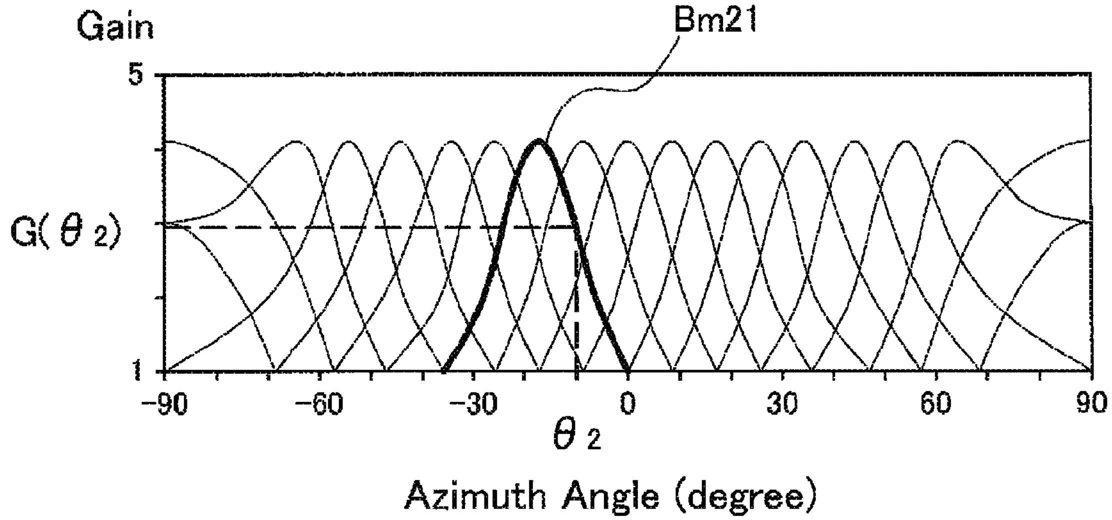
FIG. 11B is a second explanatory diagram illustrating the correction terms indicating the influence of the control of the antenna beam.

FIGS. 11A and 11B are explanatory diagrams illustrating correction terms indicating an influence of control of an antenna beam. Referring to FIG. 11A, the beam steering gain of each azimuth angle is graphed for a beam pattern set which can be used by a certain base station. A beam pattern Bm11 indicated by a thick line is a beam pattern that is assumed to be used as a result of the interference control. Here, an azimuth angle of a direction oriented from this base station to a terminal device which is a handover decision target is assumed to be $\theta_1$. Then, the beam steering gain in a pair of the base station and the terminal device is determined that the beam steering gain is the same as $G(\theta_1)$ from the thick-line graph of the beam pattern Bm11. Similarly, referring to FIG. 11B, the beam steering gain of each azimuth angle is graphed for another beam pattern set which can be used by a certain base station. A beam pattern Bm21 indicated by a thick line is a beam pattern that is assumed as a result of the interference control. Here, an azimuth angle of a direction oriented from this base station to a terminal device which is a handover decision target is assumed to be $\theta_2$. Then, the beam steering gain in a pair of the base station and the terminal device is determined that the beam steering gain is the same as $G(\theta_2)$ from the thick-line graph of the beam pattern Bm21.

The storage unit 120 stores the graph of the corresponding beam steering gain for each beam pattern set which can be used by each base station in advance. The decision unit 134 specifies the graph of the beam pattern assumed to be used by the serving base station among the stored graphs. Then, the decision unit 134 can determine the beam steering gain based on a factor calculated from the position information regarding the terminal device and the serving base station and the specified graph. The value of the corrected term $G_S$ can correspond to a variation amount of the beam steering gain from the time of the measurement. Similarly, the decision unit 134 specifies the graph of the beam pattern assumed to be used by the i-th candidate of the target base station among the stored graphs. Then, the decision unit 134 can determine the beam steering gain based on a factor calculated from the position information regarding the terminal device and the i-th candidate of the target base station and the specified graph. The value of the corrected term $G_{Ti}$ can correspond to a variation amount of the beam steering gain from the time of the measurement.

Instead of formulae (5) and (6), the corrected terms $G_S$ and $G_{Ti}$ may be terms that indicate an assumed influence of the control of the transmission power, as in the following formulae (7) and (8).

[Math 5]

$$G_S = dP_S \tag{7}$$

$$G_{Ti} = dP_{Ti} \tag{8}$$

Here, a parameter $dP_S$ on the right side of formula (7) indicates a variation amount of transmission power of the serving base station from the time of the measurement. Further, a parameter $dP_{Ti}$ on the right side of formula (8) indicates a variation amount of transmission power of the i-th candidate of the target base station from the time of the measurement.

The decision unit 134 corrects the value of the decision index described in the measurement report by factoring in the corrected terms determined using formulae (5) and (6) or formulae (7) and (8) and substitutes the corrected values into decision formula (4). Then, when decision formula (4) is satisfied, the decision unit 134 can determine the i-th candidate of the target base station as a new connection destination of the terminal device. When the plurality of candidates of the target base station satisfy decision formula (4), the base station for which the corrected decision index is the best can be selected as the target base station. When none of the candidates satisfy decision formula (4), the decision unit 134 can determine that the handover is not performed.

(3-2-2) Handover Decision Based on RSRQ

The decision unit 134 may use a received quality index calculated based on the reference signal received power as a decision index for the handover decision. An example of the received quality index is a reference signal received quality (RSRQ).

In general, the RSRQ can be calculated from the RSRP according to the following formula. A sign X indicates S meaning a serving base station or Ti meaning an i-th peripheral candidate of the target base station.

[Math 6]

$$RSRQ_X = 10\log_{10}\left\{10^{\frac{RSRP_X}{10}} \Big/ \left(\frac{10^{\frac{RSSI}{10}}}{N}\right)\right\} \tag{9}$$

For example, when RSRQ is used as the decision index, the decision unit 134 can correct the decision index $RSRQ_S$ for the serving cell and the decision index $RSRQ_{Ti}$ for an i-th peripheral cell as in the following formulae (10) and (11).

[Math 7]

$$RSRQ_S' = RSRQ_S + G_S \tag{10}$$

$$RSRQ_{Ti}' = RSRQ_{Ti} + G_{Ti} \tag{11}$$

Then, the decision formula for the handover decision can be expressed as follows.

[Math 8]

$$RSRQ_{Ti}' + c_{Ti} > RSRQ_S' + c_S + d_S \tag{12}$$

That is, the corrected terms are factored into the calculation of the received quality index RSRQ used as the decision index. In decision formula (12), parameters $c_{Ti}$, $c_S$, and $d_S$ are weight parameters corresponding to the weight parameters $a_{Ti}$ $a_S$, and $b_S$ of decision formulae (1) and (4). In calculation of a received signal strength indicator (RSSI) included in formula (9), a corrected term may be factored in as in the following formula.

[Math 9]

$$RSSI' \approx 10\log_{10}\left(10^{\frac{RSRP_S+G_S}{10}} + \sum 10^{\frac{RSRP_{Tj}+G_{Tj}}{10}}\right) \tag{13}$$

Even in this case, the corrected term is factored into the calculation of the received quality index RSRQ used as the decision index. Depending on a situation of resource assignment or a communication history in each base station, the received power of a cell in which no traffic occurs may be excluded from the addition of the received power on the right side of formula (13).

(3-2-3) Handover Decision Based on SINR

Another example of the received quality index calculated in the reference signal received power is a signal-to-interference plus noise ratio (SINR).

$SINR_S'$ which is a decision index corrected for a serving cell can be calculated according to the following formula (14). Further, $SINR_{Ti}'$ which is a decision index corrected for an i-th peripheral cell can be calculated according to the following formula (15).

[Math 10]

$$SINR_S' = RSRP_S + G_S - 10\log_{10}\left(\sum 10^{\frac{RSRP_{Tj}+G_{Tj}}{10}} + N_T\right) \tag{14}$$

$$SINR_{Ti}' = RSRP_{Ti} + G_{Ti} - 10\log_{10}\left(10^{\frac{RSRP_S+G_S}{10}} + \sum_{j\neq i} 10^{\frac{RSRP_{Tj}+G_{Tj}}{10}} + N_T\right) \tag{15}$$

In formulae (14) and (15), a parameter $N_T$ indicates thermal noise. Depending on a situation of resource assignment or a communication history in each base station, the received power of a cell in which no traffic occurs may be excluded from the addition of the received power (interference power) on the right side of formulae (14) and (15). For example, when the received power of a cell in which no traffic occurs is excluded, formulae (14) and (15) can be rewritten as follows.

[Math 11]

$$SINR_S' = RSRP_S + G_S - 10\log_{10}\left(\sum_{j\notin\Omega s} 10^{\frac{RSRP_{Tj}+G_{Tj}}{10}} + N_T\right) \tag{14'}$$

$$SINR_{Ti}' = RSRP_{Ti} + G_{Ti} - 10\log_{10}\left(10^{\frac{RSRP_S+G_S}{10}} + \sum_{j\neq i, j\notin\Omega t} 10^{\frac{RSRP_{Tj}+G_{Tj}}{10}} + N_T\right) \tag{15'}$$

In formulae (14') and (15'), each of $\Omega_s$ and $\Omega_t$ indicates a set of cells in which no traffic occurrence is predicted. The sets $\Omega_s$ and $\Omega_t$ may be determined by a device performing the handover decision. Further, the decision formula for the handover decision can be expressed as follows.

[Math 12]

$$SINR_{Ti}'+e_{Ti}>SINR_S'+e_S+f_S \tag{16}$$

That is, even in this case, the corrected terms are factored into the calculation of the received quality index SINR used as the decision index. In decision formula (16), parameters $e_{Ti}$, $e_S$, and $f_S$ are weight parameters corresponding to the weight parameters $a_{Ti}$, $a_S$, and $b_S$ of decision formulae (1) and (4). As the received quality indexes $SINR_S'$ and $SINR_{Ti}'$ in formula (16), the indexes calculated according to formula (14) or (14') and formula (15) or (15') may be combined in any manner.

(3-2-4) Handover Decision Based on Throughput

In a modification example, the decision index used for the handover decision may indicate a throughput calculated using the indexes included in the measurement report. In this case, the decision unit 134 factors in an influence of the interference control performed by the interference control unit 132 when an estimated value of the throughput after handover is calculated.

A throughput $TP_S$ of a terminal device in regard to a serving cell can be calculated with reference to a communication history of the terminal device. For example, an estimated value $TP_{Ti}$ of the throughput in regard to the i-th peripheral cell can be calculated theoretically according to the Shannon-Hartley theorem, as in the following formula (17).

[Math 13]

$$TP_{Ti}=\mathrm{floor}\left(\frac{N_{RB,Ti}}{N_{UE,Ti}+1}\right)\cdot B_{RB}\cdot\log_2(1+SINR'_{Ti}) \tag{17}$$

In formula (17), $N_{RB,Ti}$ indicates a total number of radio resources (for example, the number of resource blocks in an LTE scheme) which can be assigned per unit time by the i-th peripheral cell. $N_{UE,Ti}$ indicates the number of terminal devices connected to the i-th peripheral cell at this time. $B_{RB}$ indicates a bandwidth of one assignment unit of radio resources. $SINR_{Ti}'$ can be calculated by factoring in the corrected terms according to the above-described formula (15). Then, a decision formula for the handover decision can be expressed as follows.

[Math 14]

$$TP_{Ti}>TP_S+g_S \tag{18}$$

In decision formula (18), the parameter $g_S$ is a weight parameter corresponding to the weight parameter $b_S$ of decision formulae (1) and (4).

Here, formula (17) is a calculation formula for treating the Shannon capacity as an expected value of a throughput. In actual radio communication, a data size which can be transmitted on radio resources assigned to a certain terminal device depends on a modulation and coding scheme (MCS) selected according to channel quality indicated by a channel quality indicator (CQI). Accordingly, instead of formula (17), the throughput can be estimated as follows.

[Math 15]

$$TP_{Ti}=\frac{DS\left(SINR'_{Ti},\ \mathrm{floor}\left(\frac{N_{RB,Ti}}{N_{UE,Ti}+1}\right)\right)}{T_{RB}} \tag{19}$$

In formula (19), DS( . . . ) is a function that has channel quality $SINR_{Ti}$ and an estimated assignment amount of radio resources as factors and sets a transmittable data size as a return value.

Here, formulae (17) and (19) are based on assumption that assignable radio resources are equally distributed to all users. When an assignment amount $N_{RB,ASSIGN,Ti}$ of radio resources can be specified, formulae (17) and (19) can be rewritten as the following formulae (20) and (21), respectively.

[Math 16]

$$TP_{Ti}=N_{RB,ASSIGN,Ti}\cdot B_{RB}\cdot\log_2(1+SINR'_{Ti}) \tag{20}$$

$$TP_{Ti}=\frac{DS(SINR'_{Ti},\ N_{RB,ASSIGN,Ti})}{T_{RB}} \tag{21}$$

In this way, by using the estimated value of the throughput in which the influence of the interference control is factored in as the decision index, the viewpoint of the assignment amount of radio resources can be added to the handover decision. By multiplying an index indicating the throughput by a time amount of assignable resources, the index indicating the transmittable data size may be calculated. The handover decision may be performed based on comparison of the transmittable data size between a serving cell and a peripheral cell. When the value of the SINR is calculated to derive the throughput or the data size, a cell in which no traffic occurs may not be excluded from the calculation.

(3-2-5) Admission Control

The decision unit 134 selects a handover target base station using the corrected decision index according to any one of the decision formulae described above. In a certain embodiment, the decision unit 134 transmits the handover request to the selected target base station via the network communication unit 110. The target base station receiving the handover request can perform admission control according to some criteria. In another embodiment, the decision unit 134 may further decide whether the selected target base station is to receive connection of the terminal device. That is, in this case, the cooperation manager 100 performs the admission control instead of the target base station.

As an example, the decision unit 134 may determine whether the target base station receives the connection of the terminal device when the following formula (22) is satisfied.

[Math 17]

$$N_{UE,Ti}<N_{UE,MAX,Ti} \tag{22}$$

In formula (22), $N_{UE,Ti}$ indicates the number of terminal devices connected to the target base station at that time. $N_{UE,MAX,Ti}$ indicates the maximum value (threshold value) of the number of terminal devices which can be connected to the target base station. Instead of (or in addition to) formula (22), the decision unit 134 may determine that the target base station receives connection of the terminal device when the identifier of the terminal device is included in a whitelist stored in advance. The decision unit 134 may decide that the target base station receives the connection of the terminal device when the identifier of the terminal device is not included in a blacklist stored in advance. The identifier of the terminal device may be, for example, a telephone number, an international mobile subscriber identity (IMSI), or a SAE temporary mobile subscriber identity (S-TMSI). The whitelist or blacklist may be defined in units of systems or may be defined in units of cells. For example, a closed-type small cell can retain a list of the identifiers of terminal devices of which connection is allowed. Further, other information such as a type of terminal device, a type of contract, or a fee plan may be used to decide whether connection is allowed.

Information which can be used for the admission control may be collected from each base station along with the interference control information by the cooperation manager 100. Instead, several pieces of information may be registered in the cooperation manager 100 by an operator and may be delivered from the cooperation manager 100 to each base station.

As a modification example, the decision unit 134 may determine whether connection of a terminal device to a target base station is allowed according to the following formula (23) instead of the above-described formula (22).

[Math 18]

$$N_{UE\_NORMAL,T_i}+\mathrm{ceil}(w\cdot N_{UE\_M2M,T_i})<N_{UE,MAX,Ti} \tag{23}$$

In formula (23), $N_{UE\_NORMAL,Ti}$ indicates the number of non-M2M terminals connected to the target base station at that time and $N_{UE\_M2M,Ti}$ indicates the number of M2M terminals connected to the target base station at that time. The parameter w is a weight parameter that is multiplied by the number of M2M terminals $N_{UE\_M2M,Ti}$. A machine-to-machine (M2M) terminal refers to a type of radio communication terminal that is not carried by a user, but is mounted on a device such as an automatic vending machine, a smart meter, or a cash register in a shop. The amount of traffic transmitted and received by an M2M terminal is generally less than the amount of traffic (of video content or audio content) transmitted and received by a non-M2M terminal. Accordingly, as in formula (23), the decision unit 134 calculates the number of allowable terminals of the target base station using a weight different according to the types of terminals and compares the calculated number of allowable terminals to the threshold value $N_{UE\_M2M,Ti}$. The weight parameter w is typically set to a value less than 1. According to such admission control, the apparent number of allowable terminals in a cell can be increased.

As another modification example, as in the following formulae (24) and (25), the decision unit 134 may determine whether the connection of the terminal device to the target base station is allowed by comparing the number of allowable terminals counted for each type of terminal device to threshold values $N_{UE\_NORMAL,MAX,Ti}$ and $N_{UE\_M2M,MAX,Ti}$ defined separately according to the type.

[Math 19]

$$N_{UE\_NORMAL,T_i}<N_{UE\_NORMAL,MAX,Ti} \tag{24}$$

$$N_{UE\_M2M,T_i}<N_{UE\_M2M,MAX,Ti} \tag{25}$$

When the admission control is performed by the target base station, messages are exchanged between the cooperation manager 100 and the target base station. In particular, when the connection of the terminal device is denied as the result of the admission control, the exchange of the messages results in resource and time waste. On the other hand, when the cooperation manager 100 also performs the admission control instead of the target base station, the exchanged messages can be reduced, and thus the resource and time waste can be reduced.

When the decision unit 134 decides that the target base station receives the connection of the terminal device according to some criteria, the decision unit 134 can transmit a handover order to the target base station. The handover order is different from a handover request which is a known message and may be a message that has compulsion for giving an instruction to receive handover. By transmitting the handover order distinguished from the handover request, the target base station can recognize that it is not necessary for the self-base station to perform the admission control again.

[3-2. Flow of Process]

(1) Interference Control Process

Figure 12:
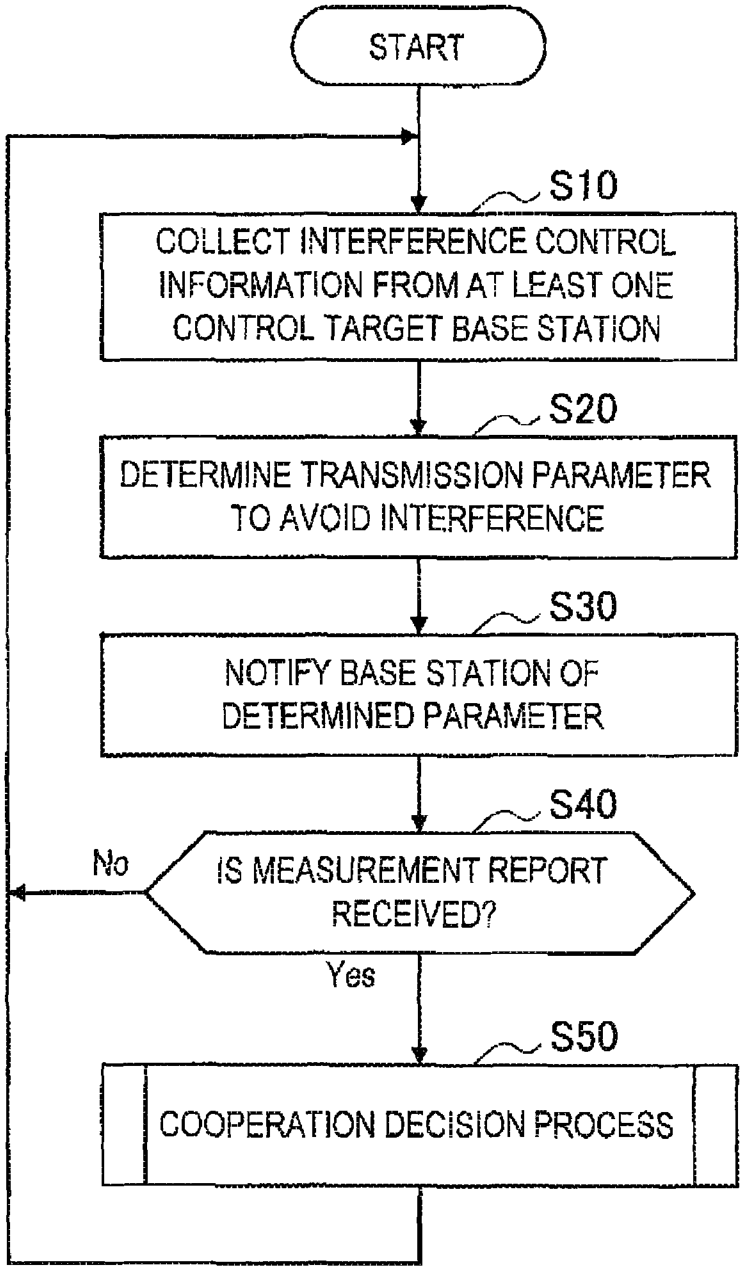
FIG. 12 is a flowchart illustrating a flow example of an interference control process according to an embodiment.

FIG. 12 is a flowchart illustrating a flow example of an interference control process which can be performed by the cooperation manager 100.

Referring to FIG. 12, the interference control unit 132 first collects the interference control information from at least one control target base station via the network communication unit 110 (step S10).

Next, the interference control unit 132 determines the transmission parameter to be used by at least one base station or terminal device based on the collected interference control information to avoid harmful interference in the system (step S20). The transmission parameter determined herein may be, for example, the beam pattern of the antenna beam or the transmission power. The determined transmission parameter is stored by the storage unit 120.

Next, the interference control unit 132 notifies the corresponding base station of the determined transmission parameter by transmitting the interference control message via the network communication unit 110 (step S30).

The decision unit 134 awaits reception of the measurement report generated by a terminal device and transferred by the serving base station of the terminal device (step S40). When the measurement report is received by the network communication unit 110, the decision unit 134 performs a cooperation decision process to be described below (step S50). Conversely, when the measurement report is not received, the process returns to step S10.

(2-1) First Example of Cooperation Decision Process

Figure 13A:
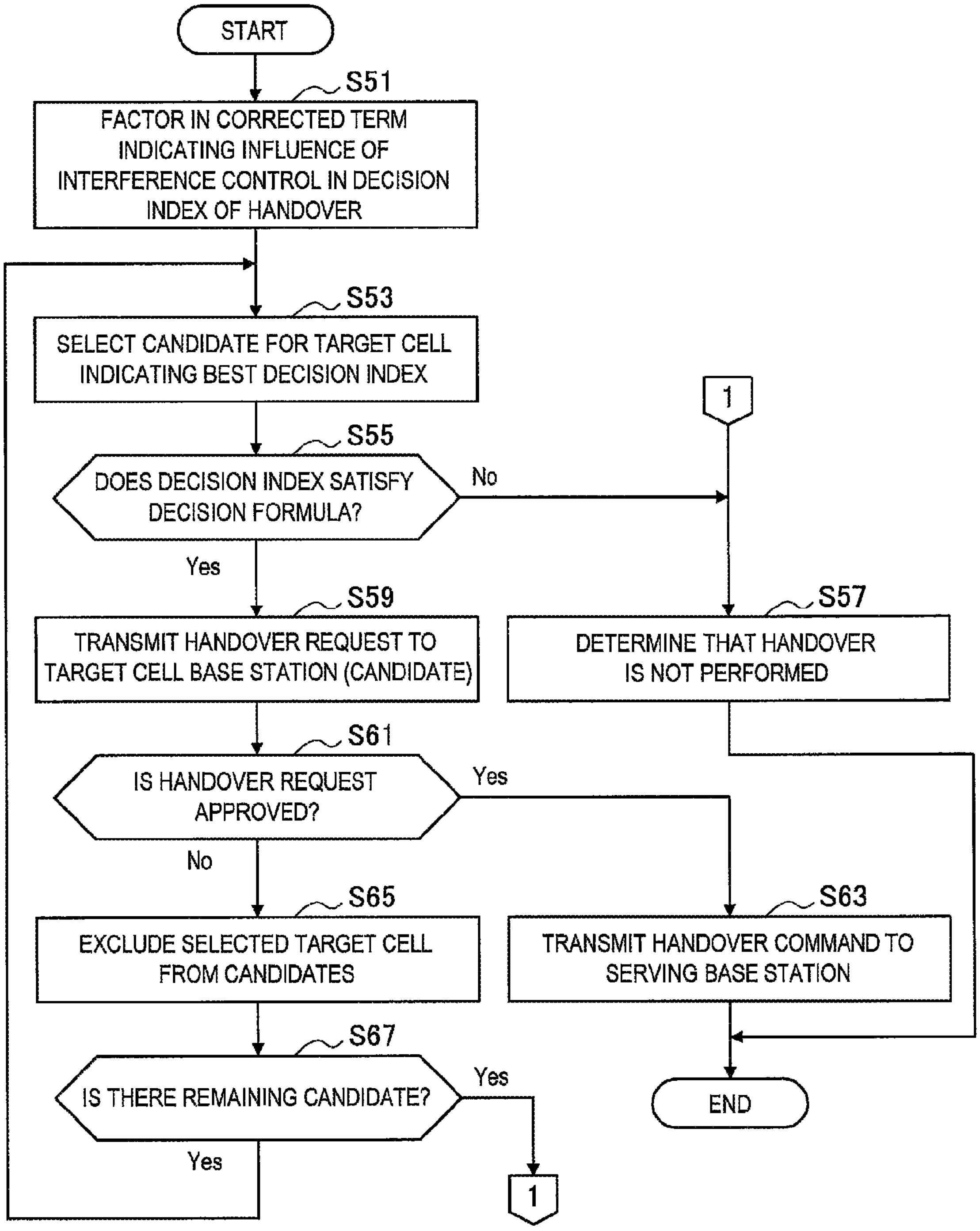
FIG. 13A is a flowchart illustrating a first flow example of a cooperation decision process according to an embodiment.

FIG. 13A is a flowchart illustrating a first flow example of the cooperation decision process which can be performed by the cooperation manager 100. In the first example, the cooperation manager 100 performs the handover decision. The admission control is performed by the target base station.

Referring to FIG. 13A, the decision unit 134 first corrects the decision index which is based on the measurement report by factoring in the influence of the interference control performed after the measurement (step S51). Here, the decision index may be any one of the RSRP, the RSRQ, the SINR, and the throughput described above or a combination of two or more thereof.

Next, when there are a plurality of candidates of the target cell, the decision unit 134 selects one candidate indicating the best decision index (step S53). Next, the decision unit 134 decides whether the corrected decision index of the serving cell and the target cell satisfies the decision formula (step S55). Here, the decision formula may be one of the decision formulae (4), (12), (16), and (18) described above or may be another decision formula.

When the corrected decision index does not satisfy the decision formula, the decision unit 134 decides that the handover is not performed (step S57). Conversely, when the corrected decision index satisfies the decision formula, the decision unit 134 transmits the handover request to the base station of the selected target cell (step S59).

Thereafter, when the handover request is approved by the target base station as the result of the admission control (step S61), the decision unit 134 transmits the handover command to the serving base station via the network communication unit 110 (step S63).

Conversely, when the handover request is not approved by the target base station, the decision unit 134 excludes the target cell selected in step S53 from the candidates (step S65). Then, when there is a remaining candidate of the target cell (step S67, the processes subsequent to step S53 are repeated on the remaining candidate. When there is no remaining candidate, the decision unit 134 determines that the handover is not performed (step S57).

(2-2) Second Example of Cooperation Decision Process

Figure 13B:
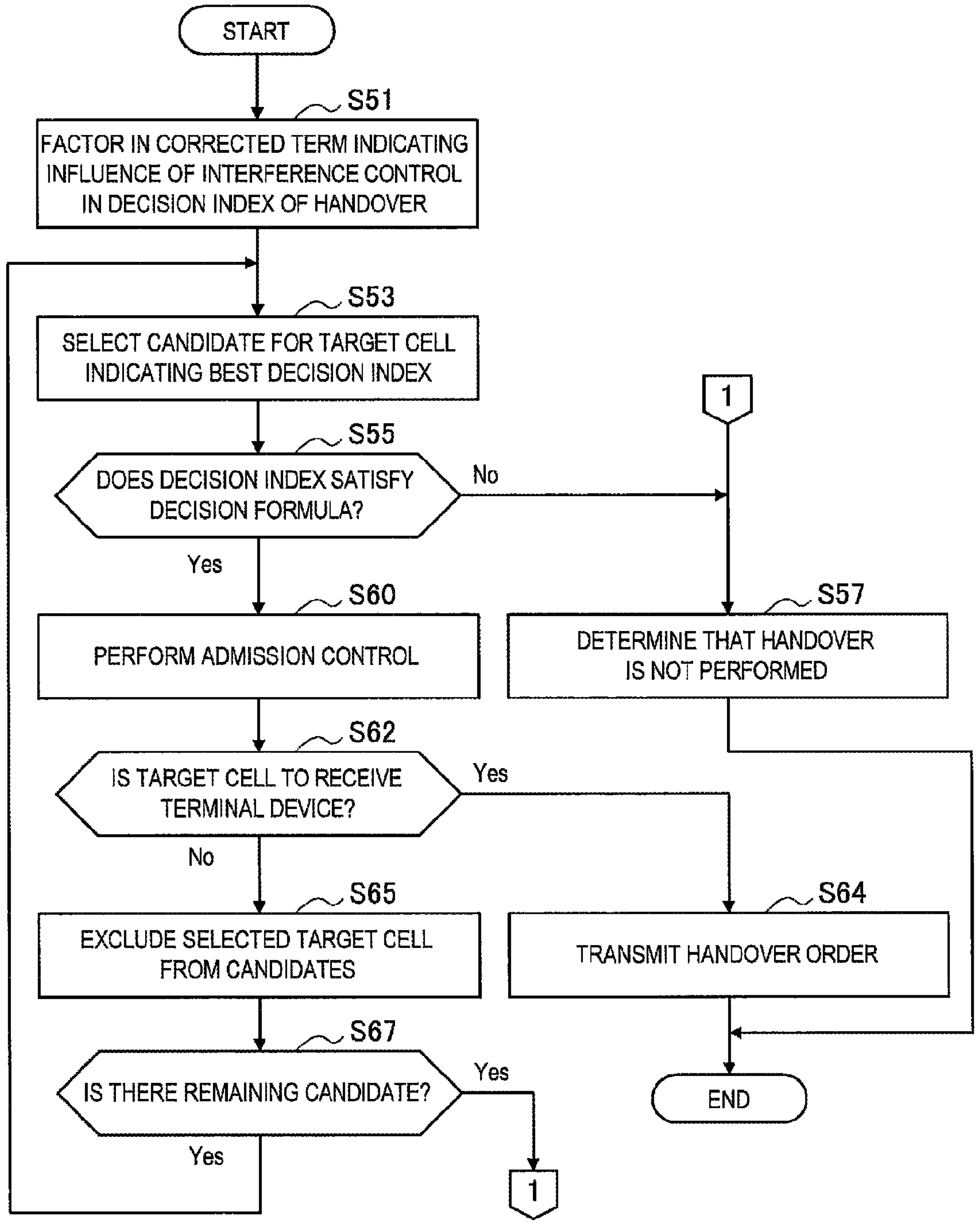
FIG. 13B is a flowchart illustrating a second flow example of the cooperation decision process according to an embodiment.

FIG. 13B is a flowchart illustrating a second flow example of the cooperation decision process which can be performed by the cooperation manager 100. In the second example, the cooperation manager 100 performs the handover decision and the admission control.

Referring to FIG. 13B, the decision unit 134 first corrects the decision index which is based on the measurement report by factoring in the influence of the interference control performed after the measurement (step S51). Here, the decision index may be any one of the RSRP, the RSRQ, the SINR, and the throughput described above or a combination of two or more thereof.

Next, when there are a plurality of candidates of the target cell, the decision unit 134 selects one candidate indicating the best decision index (step S53). Next, the decision unit 134 decides whether the corrected decision index of the serving cell and the target cell satisfies the decision formula (step S55). Here, the decision formula may be one of the decision formulae (4), (12), (16), and (18) described above or may be another decision formula.

When the corrected decision index does not satisfy the decision formula, the decision unit 134 decides that the handover is not performed (step S57).

Conversely, when the corrected decision index satisfies the decision formula, the decision unit 134 performs the admission control on the selected target cell (step S60). For example, the decision unit 134 may compare the number of terminal devices connected to the target base station to the threshold value, as expressed in formula (22), (23), (24), or (25). The decision unit 134 may combine the identifier of the terminal device with a list of allowed or denied identifiers.

When the decision unit 134 decides that the target cell receives the terminal device as the result of the admission control, the decision unit 134 transmits the handover order to the target base station or the serving base station via the network communication unit 110 (step S64).

Conversely, when the decision unit 134 decides that the target cell does not receive the terminal device as the result of the admission control, the decision unit 134 excludes the target cell selected in step S53 from the candidates (step S65). Then, when there is a remaining candidate of the target cell (step S67), the processes subsequent to step S53 are repeated on the remaining candidate. When there is no remaining candidate, the decision unit 134 determines that the handover is not performed (step S57).

<4. Configuration Example of Base Station>

In this section, the configuration of a base station which is a control target of the cooperation manager 100 will be described. When the measurement report is received from a terminal device, a base station entrusting the handover decision to the cooperation manager 100 transfers the received measurement report to the cooperation manager 100 without performing the handover decision by itself. Then, the base station performs a handover procedure according to decision of the cooperation manager 100.

[4-1. Configuration Example of Device]

Figure 14:
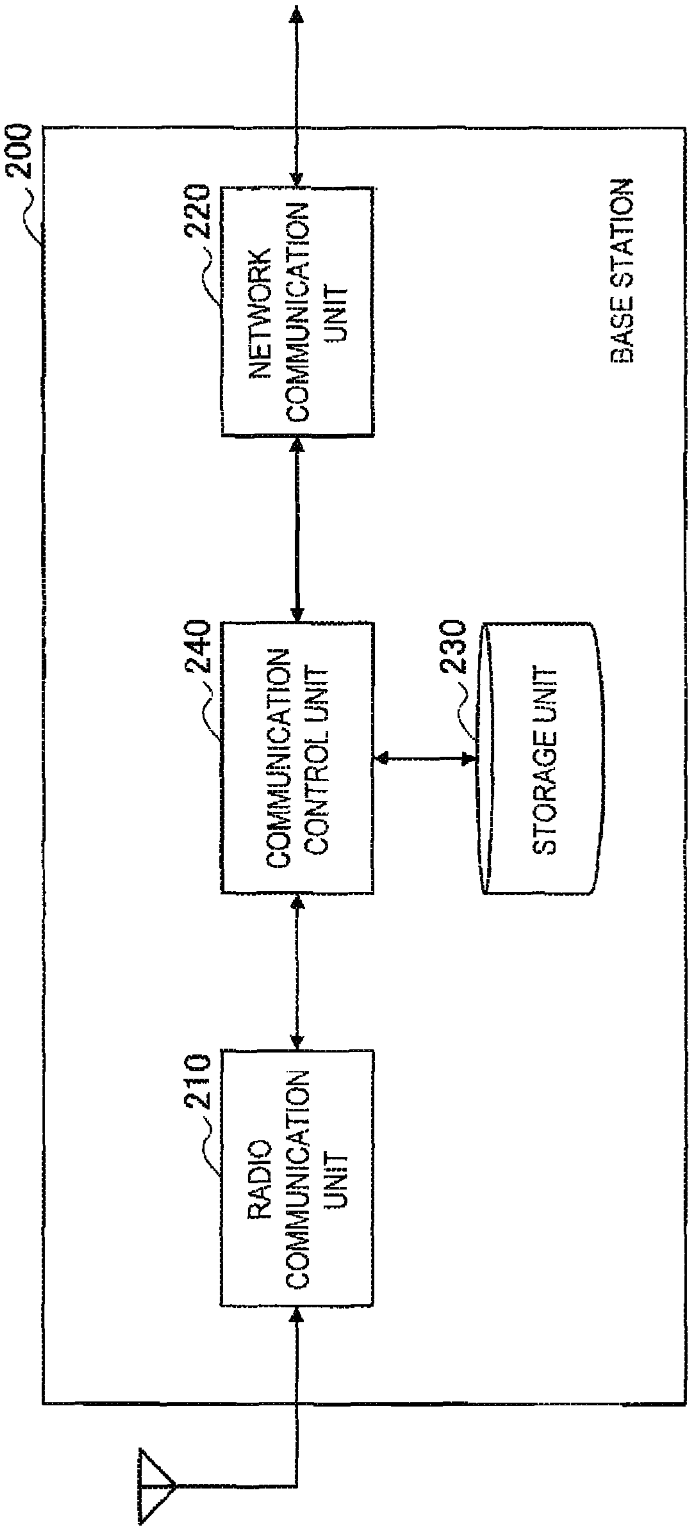
FIG. 14 is a block diagram illustrating a configuration example of a base station according to an embodiment.

FIG. 14 is a block diagram illustrating a configuration example of a base station 200 according to an embodiment. Referring to FIG. 14, the base station 200 includes a radio communication unit 210, a network communication unit 220, a storage unit 230, and a communication control unit 240.

(1) Radio Communication Unit

The radio communication unit 210 is a radio communication interface (or a radio transceiver) that performs radio communication with at least one terminal device. The radio communication unit 210 can typically include an antenna, a radio frequency (RF) circuit, and a baseband processor. The radio communication unit 210 codes and modulates a transmission signal in conformity with a modulation coding scheme selected according to the quality of a downlink channel. The radio communication unit 210 demodulates and decodes a received signal in conformity with a modulation and coding scheme selected according to the quality of an uplink channel. The transmission power of a radio signal transmitted from the radio communication unit 210 is set by the communication control unit 240 to be described below. A terminal device is instructed of the transmission power of a radio signal received by the radio communication unit 210 by the communication control unit 240. The radio communication unit 210 may include a plurality of antennas capable of beam steering. In this case, a beam pattern of an antenna beam of the radio communication unit 210 can also be set by the communication control unit 240.

(2) Network Communication Unit

The network communication unit 220 is a communication interface that is connected to the core network 16 exemplified in FIG. 1 and another base station. The network communication unit 220 transfers uplink traffic received by the radio communication unit 210 to the core network 16. The network communication unit 220 receives downlink traffic to be transmitted to a terminal device from the core network 16. The network communication unit 220 can exchange a message with the cooperation manager 100 which can be mounted on a control node or another base station in the core network 16. The cooperation manager 100 is a communication control device that performs interference control.

(3) Storage Unit

The storage unit 230 stores a program and data for an operation of the base station 200 using a storage medium such as a hard disk or a semiconductor memory. For example, the data stored by the storage unit 230 can include at least one of position information, antenna configuration information, maximum transmission power information, rate control information, channel quality information, resource assignment information, and communication history information regarding the base station 200 and each terminal device connected to the base station 200. At least some of the pieces of information can be supplied as interference control information to the cooperation manager 100.

(4) Communication Control Unit

The communication control unit 240 controls overall operations of the base station 200 using a processor such as a CPU or a DSP. For example, the communication control unit 240 schedules communication resources to perform communication with a terminal device connected to the base station 200 and generates resource assignment information.

The communication control unit 240 selects a modulation and coding scheme according to the channel quality of a radio channel with the terminal device. The communication control unit 240 sets downlink transmission power to be used by the radio communication unit 210 and uplink transmission power to be used by each terminal device. The communication control unit 240 sets a beam pattern to be used when the beam steering is possible in the radio communication unit 210.

For example, when an interference control message is received from the cooperation manager 100 via the network communication unit 220, the communication control unit 240 may set transmission power described in the interference control message in the radio communication unit 210. The communication control unit 240 may instruct the terminal device to use the transmission power described in the interference control message. The communication control unit 240 may set a beam pattern described in the interference control message in the radio communication unit 210 or instruct the terminal device of the beam pattern. Thus, it is possible to realize cooperative interference control between cells.

When a measurement report generated by the terminal device is received by the radio communication unit 210, the communication control unit 240 transfers the measurement report to the cooperation manager 100 to cause the cooperation manager 100 to perform the handover decision. The measurement report transferred herein can include a decision index used for the handover decision. The cooperation manager 100 corrects the decision index by factoring in the influence of the interference control performed after the measurement by the terminal device and performs the handover decision for the terminal device using the corrected decision index. When the communication control unit 240 transfers the measurement report to the cooperation manager 100, the communication control unit 240 may mask or delete the identification information for identifying the individual terminal device from the viewpoint of privacy protection. In this case, the communication control unit 240 may cause the storage unit 230 to temporarily store association of the transferred report with the terminal device generating this report and may use the association to identify for which terminal device a subsequently received handover command is used.

After the communication control unit 240 transfers the measurement report to the cooperation manager 100, the communication control unit 240 can perform a handover procedure as a source base station according to the determination of the cooperation manager 100. For example, after the communication control unit 240 transmits the handover command to the terminal device, the communication control unit 240 transfers downlink traffic destined for this terminal device to a designated target base station.

When the base station 200 is selected as the target base station by the cooperation manager 100 and the cooperation manager 100 does not perform the admission control, the communication control unit 240 may perform the admission control according to the reception of the handover request. When the base station 200 is selected as a target base station by the cooperation manager 100 and the admission control is already performed by the cooperation manager 100, the communication control unit 240 may perform a handover procedure as the target base station according to the reception of the handover order from the cooperation manager 100.

[4-2. Flow of Process]

Figure 15:
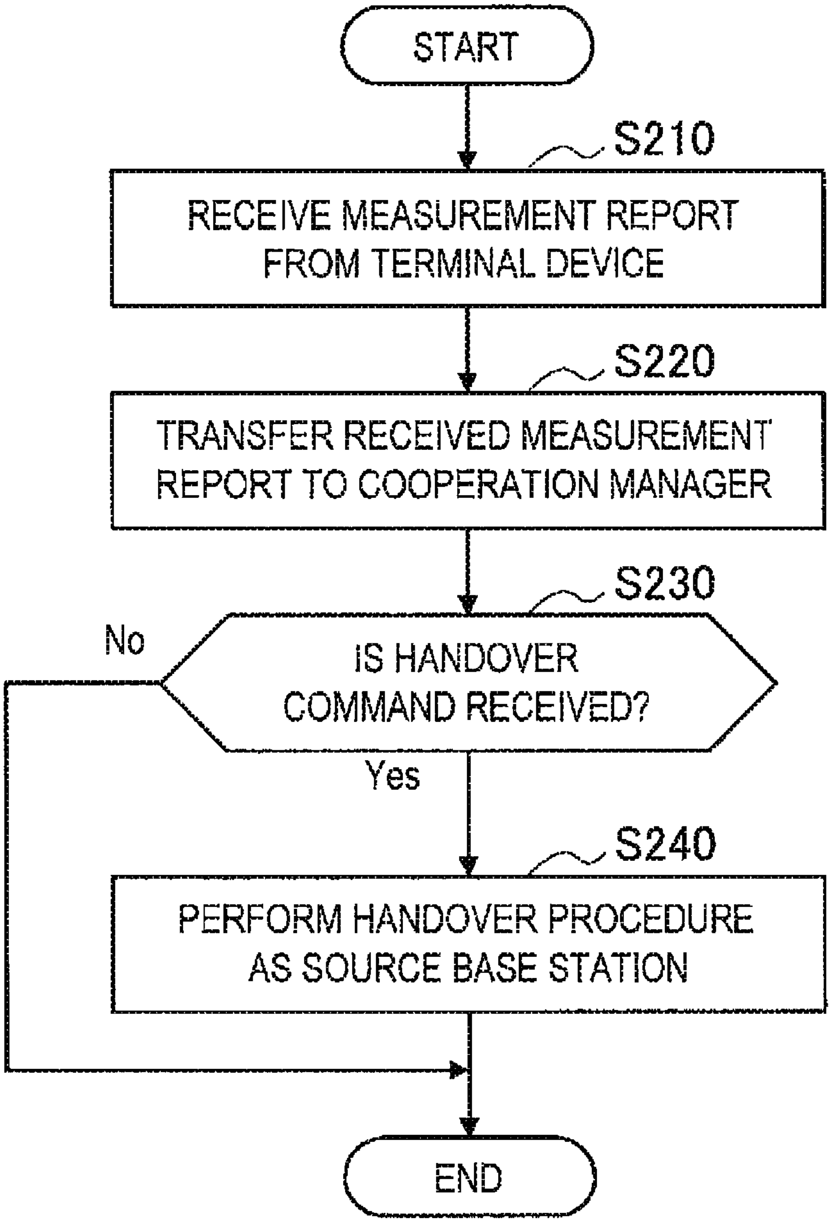
FIG. 15 is a flowchart illustrating a flow example of a measurement report transfer process according to an embodiment.

FIG. 15 is a flowchart illustrating a flow example of the measurement report transfer process performed by the base station 200 according to an embodiment.

Referring to FIG. 15, the radio communication unit 210 first receives the measurement report from the terminal device connected to the base station 200 (step S210).

Next, the communication control unit 240 transfers the measurement report received by the radio communication unit 210 to the cooperation manager 100 via the network communication unit 220 (step S220).

Thereafter, the communication control unit 240 waits to receive the handover command from the cooperation manager 100 or another base station (step S230).

Then, when the communication control unit 240 receives the handover command, the communication control unit 240 performs the handover procedure from the source base station (step S240).

<5. Configuration Example of Terminal Device>

[5-1. Configuration Example of Device]

Figure 16:
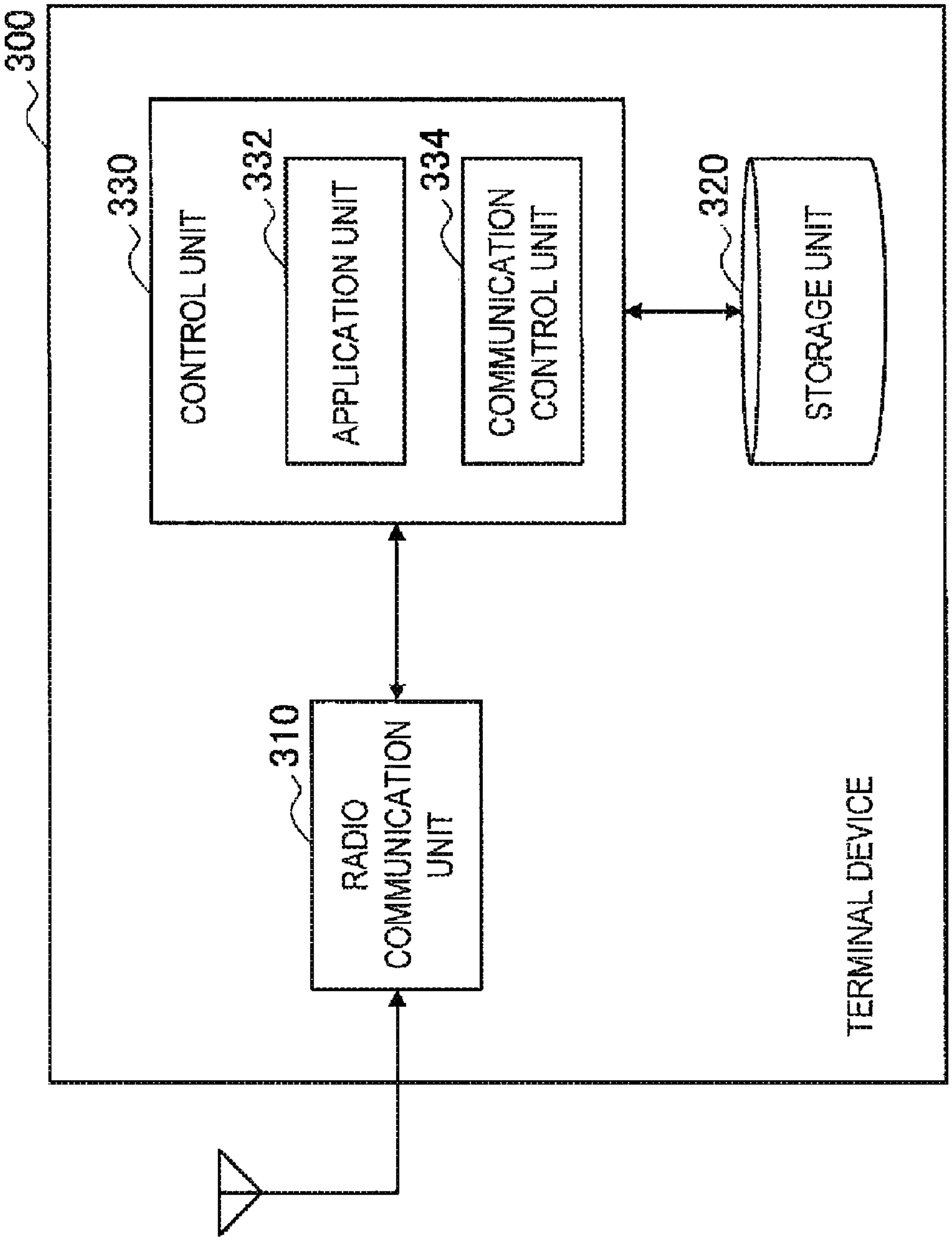
FIG. 16 is a block diagram illustrating a configuration example of a terminal device according to an embodiment.

FIG. 16 is a block diagram illustrating a configuration example of a terminal device 300 according to an embodiment. Referring to FIG. 16, the terminal device 300 includes a radio communication unit 310, a storage unit 320, and a control unit 330.

(1) Radio Communication Unit

The radio communication unit 310 is a radio communication interface (or a radio transceiver) that performs radio communication with the base station. The radio communication unit 310 can typically include an antenna, an RF circuit, and a baseband processor. The radio communication unit 310 codes and modulates a transmission signal in conformity with a modulation and coding scheme according to the quality of an uplink channel and demodulates and decodes a received signal in conformity with a modulation and coding scheme according to the quality of a downlink channel. The transmission power of a radio signal transmitted from the radio communication unit 310 is set by a communication control unit 334 to be described below. The radio communication unit 310 may include a plurality of antennas capable of beam steering. In the case, a beam pattern of an antenna beam of the radio communication unit 310 can also be set by the communication control unit 334.

(2) Storage Unit

The storage unit 320 stores a program and data for an operation of the terminal device 300 using a storage medium such as a hard disk or a semiconductor memory. For example, the data stored by the storage unit 320 can include at least one of identification information, position information, antenna configuration information, and maximum transmission power information regarding the terminal device 300.

(3) Control Unit

The control unit 330 controls overall operations of the terminal device 300 using a processor such as a CPU or a DSP. In the example of FIG. 16, the control unit 330 includes an application unit 332 and a communication control unit 334.

(3-1) Application Unit

An application of a higher layer is mounted on the application unit 332. The application unit 332 generates data traffic to be transmitted to the base station and outputs the generated data traffic to the radio communication unit 310. The application unit 332 processes data traffic received from the base station by the radio communication unit 310.

(3-2) Communication Control Unit

The communication control unit 334 controls radio communication performed by the radio communication unit 310.

For example, the communication control unit 334 causes the radio communication unit 310 to transmit a radio signal or receive a radio signal according to the resource assignment information received from the base station. The communication control unit 334 sets a modulation and coding scheme selected according to the channel quality of a radio channel by the base station in the radio communication unit 310. The communication control unit 334 sets uplink transmission power to be used by the radio communication unit 310 according to a power control command received from the base station. The communication control unit 334 sets a beam pattern to be used when beam steering is possible in the radio communication unit 310.

The communication control unit 334 performs the measurement periodically or according to an instruction form the serving base station. In the measurement, the radio communication unit 310 receives a reference signal transmitted from a serving base station and a reference signal transmitted from at least one peripheral base station and measures the received power. The communication control unit 334 generates the measurement report based on the measured value of the received power. In addition to the identification information of the terminal device, the measurement report includes indexes for the serving cell used for the handover decision and at least one peripheral cell. Then, the communication control unit 334 transmits the generated measurement report from the radio communication unit 310 to the serving base station.

The communication control unit 334 performs the handover procedure when the handover command is received from the serving base station by the radio communication unit 310. Specifically, the communication control unit 334 acquires synchronization with the target base station by searching for a synchronization signal from the target base station and causes the radio communication unit 310 to transmit the random access signal to the target base station on the random access channel identified with reference to the system information. When the random access succeeds, the target base station newly becomes a serving base station of the terminal device 300.

[5-2. Modification Examples]

In the example described above, the decision indexes for the handover decision are corrected by the cooperation manager 100. However, as a modification example, corrected terms may be generated by the terminal device 300.

For example, when the radio communication unit 310 includes a plurality of antennas capable of beam steering, the communication control unit 334 may generate corrected terms indicating an influence of an antenna beam assumed to be formed by the antenna of the radio communication unit 310 after the measurement (or after handover). Then, the communication control unit 334 may include, for example, the values of added decision indexes of the corrected terms as in the following formulae (26) and (27) in the measurement report used for the handover decision.

[Math 20]

$$RSRP_{S\_REP,}=RSRP_{S\_MEAS}+G_{UE,S} \tag{26}$$

$$RSRP_{Ti\_REP}=RSRP_{Ti\_MEAS}+G_{UE,Ti} \tag{27}$$

In formula (26), $RSRP_{S\_MEAS}$ is a reference signal received power for a serving cell, $RSRP_{S\_REP}$ is reference signal received power corrected for the serving cell, and $G_{UE,S}$ is a terminal-specific corrected term for the serving cell. In formula (27), $RSRP_{Ti\_MEAS}$ is reference signal received power measured for the i-th peripheral cell, $RSRP_{Ti\_REP}$ is reference signal received power corrected for the i-th peripheral cell, and $G_{UE,Ti}$ is a terminal-specific corrected term for the i-th peripheral cell. The terminal-specific corrected terms differ because a positional relation between the terminal and each base station differs.

For example, the terminal-specific corrected terms $G_{UE,S}$ and $G_{UE,Ti}$ may be terms indicating an influence of the beam steering, as in the following formulae (28) and (29).

[Math 21]

$$G_{UE,S}=dG(\theta_{UE,S},\phi_{UE,S},r_{UE,S}) \tag{28}$$

$$G_{UE,Ti}=dG(\theta_{UE,Ti},\phi_{UE,Ti},r_{UE,Ti}) \tag{29}$$

Here, functions dG( . . . ) on the right sides of formulae (28) and (29) are functions that have an azimuth angle and an elevation or depression angle of a direction oriented from a terminal device to a base station and a distance from the terminal device to the base station as factors, and a variation amount of a beam steering gain is set as a return value. At least one factor of the functions dG may be omitted.

The communication control unit 334 may include all of the decision indexes before the correction and the corrected terms in the measurement report instead of adding the corrected terms to the decision indexes as in formulae (26) and (27). The communication control unit 334 may transmit a message for notification of the corrected terms from the radio communication unit 310 to the serving base station apart from the measurement report.

The terminal-specific corrected terms may be calculated by the cooperation manager 100. In this case, the interference control parameter (for example, the beam pattern to be used by the terminal device 300) corresponding to the calculated corrected terms can be signaled from the cooperation manager 100 to the terminal device 300 via the serving base station, so that the interference control parameter can be used by the terminal device 300. In the handover decision, for example, all of the corrected terms of formulae (2) and (3) and the corrected terms of formulae (26) and (27) may be used.

[5-3. Flow of Process]

Figure 17:
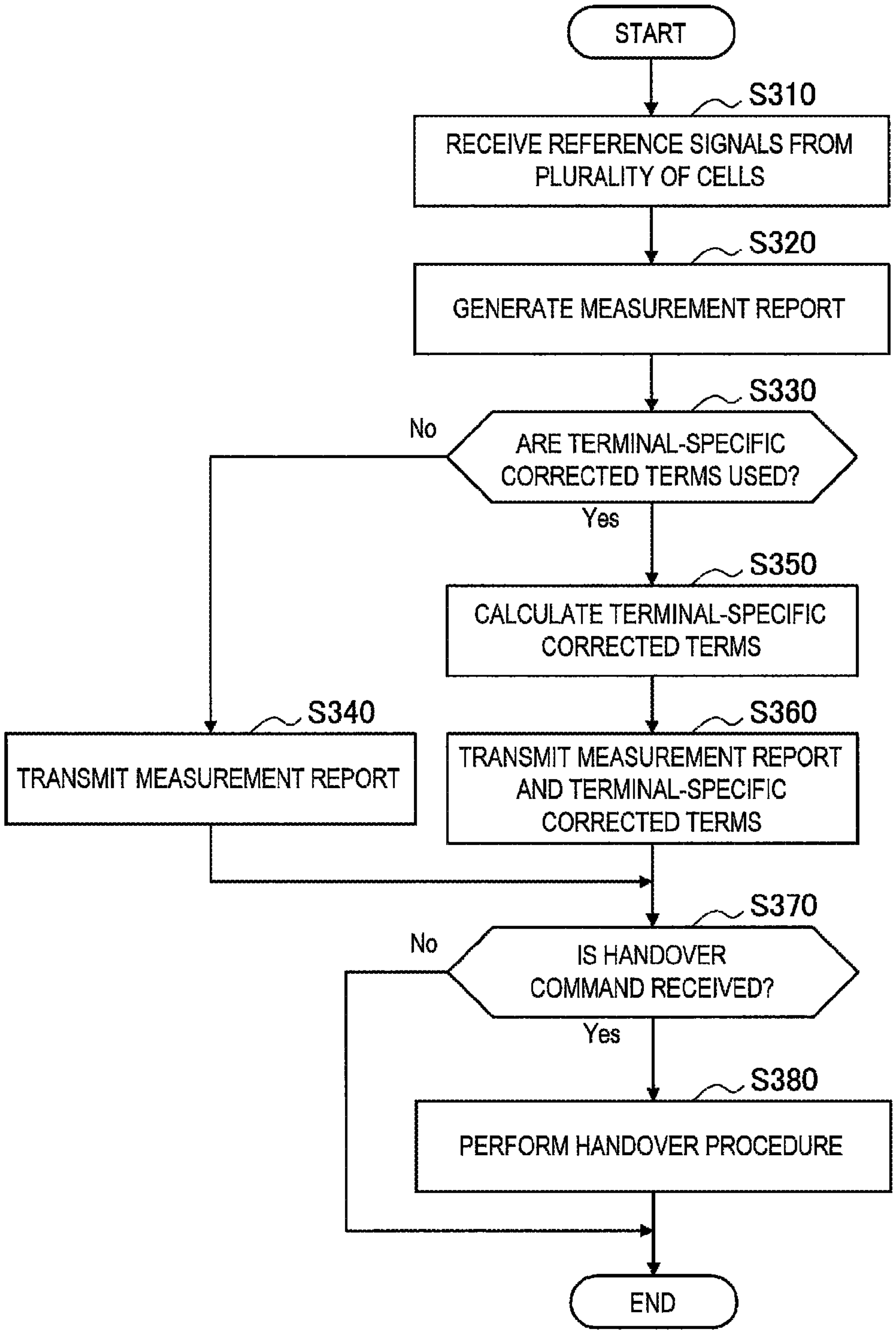
FIG. 17 is a flowchart illustrating a flow example of a measurement report process according to an embodiment.

FIG. 17 is a flowchart illustrating a flow example of a measurement report process performed by the terminal device 300 according to an embodiment.

Referring to FIG. 17, the radio communication unit 310 first receives the reference signal transmitted in regard to the serving cell and the reference signal transmitted in regard to at least one peripheral cell and measures the received power of each cell (step S31).

Next, the communication control unit 334 generates the measurement report based on the value of the received power measured by the radio communication unit 310 (step S320). Further, the communication control unit 334 decides whether the terminal-specific corrected terms are used in the handover decision (step S330).

When the terminal-specific corrected terms are not used, the communication control unit 334 transmits the measurement report generated in step S310 from the radio communication unit 310 to the serving base station (step S340).

When the terminal-specific corrected terms are used, the communication control unit 334 calculates each of the corrected terms indicating the influence of the antenna beam assumed to be formed by the antenna of the radio communication unit 310 after the measurement (or after the handover to each candidate of the target base station) (step S350). Then, the communication control unit 334 transmits the calculated corrected terms from the radio communication unit 310 to the serving base station in the measurement report or apart from the measurement report (step S360).

Thereafter, the communication control unit 334 waits to receive the handover command from the serving base station (step S370). Then, when the communication control unit 334 receives the handover command, the communication control unit 334 performs the handover procedure to the designated target base station (step S380).

<6. Conclusion>

The embodiments of the technologies according to the present disclosure have been described above in detail with reference to FIGS. 1 to 17. According to the above-described embodiments, in the cooperation manager (communication control device) that performs the interference control for the radio communication system including a plurality of base stations and a plurality of terminal devices, the decision index which is based on the measurement report generated by a terminal device is corrected by factoring in an influence of the interference control performed after the measurement by the terminal device, and the handover decision on the terminal device is performed using the corrected decision index. Accordingly, at the time of the handover decision in a situation in which cooperative interference control is performed, it is possible to reliably select an optimum connection destination cell. As a result, resource use efficiency of the entire system is improved.

According to the above-described embodiments, the measurement report generated by a terminal device is transferred to the cooperation manager by the serving base station of the terminal device. Accordingly, the cooperation manager can perform the handover decision in a timely manner in consideration of the influence of the interference control at a timing at which the handover decision is necessary. The terminal device may transmit the measurement report to the serving base station in a similar procedure to a known handover procedure. Therefore, it is not necessary to alter the terminal device in order to mount a technology according to the present disclosure and the above-described new structure can also be applied to a terminal device already on the market.

According to the above-described embodiments, when the antenna beam is controlled by the cooperation manager, the decision index for the handover decision is corrected by factoring in the corrected term indicating the assumed influence of the control of the antenna beam. Accordingly, a change in the gain caused due to the beam control that is difficult to estimate in an individual terminal device or base station can be considered in the handover decision.

According to the above-described embodiments, when the transmission power is controlled by the cooperation manager, the decision index for the handover decision is corrected by factoring in the corrected term indicating the assumed influence of the control of the transmission power. Accordingly, a change in the received power caused due to the transmission power control that is difficult to estimate in an individual terminal device or base station can be considered in the handover decision.

As one example, the corrected term may be an offset value of the RSRP. In this case, since the corrected term can be factored into the handover decision by slightly changing the decision formula of the handover decision, the technology according to the present disclosure can be realized at low cost. As another example, the corrected term may also be factored into calculation of a received quality index such as the RSRQ or the SINR calculated based on the RSRP. In this case, by performing more advanced handover decision than in a case in which the RSRP itself is used, it is possible to connect each terminal device to a cell with optimum channel quality. As still another example, the influence of the interference control may be factored in when the estimated value of the throughput after handover is calculated. In this case, it is possible to optimize the communication capacity of the entire system.

According to the above-described embodiments, the cooperation manager can also perform the admission control instead of the target base station. In such a configuration, since messages exchanged between the cooperation manager and candidates of the target base station are reduced, resource and time waste necessary to exchange the messages can be reduced.

According to a certain modification example, when a terminal device has an antenna capable of beam steering, the terminal-specific corrected term of the decision index related to the measurement report used for the handover decision is calculated such that the terminal-specific corrected term indicates the influence of the antenna beam assumed to be formed after the measurement in the terminal device. Then, the calculated terminal-specific corrected term is transmitted to the serving base station in the measurement report or apart from the measurement report. Accordingly, the cooperation manager (or the serving base station) can perform the handover decision in consideration of the influence of the beam steering in the terminal device. Thus, it is possible to further increase a possibility of an optimum connection destination cell being selected.

The technology according to the present disclosure can also be applied to a case in which the cooperation manger performs control other than the interference control. For example, the cooperation manager controls radio resources (for example, a time, a frequency, a code, or spatial resources) assigned to each base station or each terminal to improve the performance such as the capacity or throughput of a system. The cooperation manger can correct the decision index which is based on the measurement report transferred from the serving base station by factoring in the influence of the control of the radio resources performed after the measurement by the terminal device and can perform the handover decision on the terminal device using the corrected decision index.

Further, a series of control processes by the respective devices described in the present description may be implemented using any one of software, hardware, and a combination of hardware and software. For example, a program configuring software is stored in a storage medium (a non-transitory medium) installed inside or outside each device. Further, for example, each program is read onto a Random Access Memory (RAM) at the time of execution and executed by a processor such as a Central Processing Unit (CPU).

Further, the processes described using the flowcharts in the present description may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control device including:

an interference control unit configured to perform interference control for a radio communication system including a plurality of base stations and a plurality of terminal devices; and a decision unit configured to correct a decision index which is based on a measurement report generated by a first terminal device by factoring in an influence of the interference control performed by the interference control unit after the first terminal device performs measurement and to perform handover decision on the first terminal device using the corrected decision index.

(2)

The communication control device according to (1), wherein the measurement report is transferred to the communication control device by a serving base station of the first terminal device.

(3)

The communication control device according to (1) or (2), wherein the interference control unit controls an antenna beam of at least one base station or at least one terminal device, and wherein the decision unit corrects the decision index by factoring in a corrected term indicating an influence of the control of the antenna beam.

(4)

The communication control device according to any one of (1) to (3), wherein the interference control unit controls transmission power of at least one base station or at least one terminal device, and wherein the decision unit corrects the decision index by factoring in a corrected term indicating an influence of the control of the transmission power.

(5)

The communication control device according to (3) or (4), wherein the decision index includes reference signal received power (RSRP), and wherein the corrected term is an offset value of the RSRP.

(6)

The communication control device according to (3) or (4), wherein the decision index includes a received quality index calculated based on a reference signal received power (RSRP), and wherein the corrected term is factored into the calculation of the received quality index.

(7)

The communication control device according to any one of (1) to (4), wherein the decision index indicates a throughput calculated using an index included in the measurement report, and wherein the decision unit factors in the influence of the interference control when an estimated value of the throughput after handover is calculated.

(8)

The communication control device according to any one of (1) to (7), wherein the decision unit further decides whether a target base station selected using the corrected decision index is to receive connection of the first terminal device.

(9)

The communication control device according to (8), wherein the decision unit transmits a message to instruct the target base station to receive handover to the target base station when the decision unit decides that the target base station is to receive the connection of the first terminal device.

(10)

The communication control device according to (8) or (9), wherein the decision unit decides whether the connection of the first terminal device is to be received by comparing the number of allowable terminals of the target base station calculated using a weight different according to a type of terminal to a threshold value.

(11)

The communication control device according to (8) or (9), wherein the decision unit decides whether the connection of the first terminal device is to be received by comparing the number of allowable terminals of the target base station counted for each type of terminal to a threshold value different for each type of terminal.

(12)

A communication control method that is performed by a communication control device, the communication control method including:

performing interference control for a radio communication system including a plurality of base stations and a plurality of terminal devices;

correcting a decision index which is based on a measurement report generated by a first terminal device by factoring in an influence of the interference control performed after the first terminal device performs measurement; and performing handover decision on the first terminal device using the corrected decision index.

(13)

A radio communication system including:

a plurality of base stations;

a plurality of terminal devices; and a control node configured to perform interference control for the radio communication system, wherein the control node corrects a decision index which is based on a measurement report generated by a first terminal device by factoring in an influence of the interference control performed after the first terminal device performs measurement and performs handover decision on the first terminal device using the corrected decision index.

(14)

The radio communication system according to (13), wherein the control node is a different node from the plurality of base stations.

(15)

The radio communication system according to (13), wherein the control node is a node mounted on one of the plurality of base stations.

(16)

A base station including:

a communication unit configured to communicate with a communication control device that performs interference control for a radio communication system including a plurality of base stations and a plurality of terminal devices; and a control unit configured to cause the communication unit to transfer a measurement report generated by a first terminal device and used for handover decision to the communication control device that performs the handover decision on the first terminal device.

(17)

A terminal device including:

a radio communication unit configured to transmit or receive a radio signal using an antenna capable of beam steering; and a control unit configured to generate a measurement report used for handover decision and transmit, in the measurement report or apart from the measurement report, a corrected term indicating an influence of an antenna beam assumed to be formed by the antenna after measurement from the radio communication unit to a serving base station.

(18)

A communication control device including:

a control unit configured to perform control of radio resources for a radio communication system including a plurality of base stations and a plurality of terminal devices; and a decision unit configured to correct a decision index which is based on a measurement report generated by a first terminal device by factoring in an influence of the control of the radio resources performed by the control unit after the first terminal device performs measurement and to perform handover decision on the first terminal device using the corrected decision index.

REFERENCE SIGNS LIST

100 communication control device (cooperation manager)
110 network communication unit
120 storage unit
132 interference control unit
134 decision unit
200 base station
210 radio communication unit
220 network communication unit
230 storage unit
240 communication control unit
300 terminal device
310 radio communication unit
320 storage unit
334 communication control unit

The invention claimed is:

1. A communication control device, having a processor, comprising:

processor circuitry configured to perform interference control for a radio communication system including a plurality of base stations and a plurality of terminal devices, and configured to correct a decision index which is based on a measurement report generated by a first terminal device by factoring in an influence of the interference control performed by the processor circuitry after the first terminal device performs measurement and to perform handover decision on the first terminal device using the corrected decision index, wherein the processor circuitry further decides whether a target base station selected using the corrected decision index is to receive connection of the first terminal device, and wherein the processor circuitry further decides whether the connection of the first terminal device is to be received by comparing a number of each type of terminal, of the terminals connected to the target base station and including the first terminal device, to a respective threshold value different for each type of terminal.

2. The communication control device according to claim 1, wherein the measurement report is transferred to the communication control device by a serving base station of the first terminal device.

3. The communication control device according to claim 1, wherein the processor circuitry controls an antenna beam of at least one base station or at least one terminal device, and wherein the processor circuitry corrects the decision index by factoring in a corrected term indicating an influence of the control of the antenna beam.

4. The communication control device according to claim 3, wherein the decision index includes reference signal received power (RSRP), and wherein the corrected term is an offset value of the RSRP.

5. The communication control device according to claim 4, wherein the processor circuitry corrects the reference signal received power for a serving cell and the reference signal received power for a peripheral cell based on an influence of interference control of interference due to overlap between the serving cell and the peripheral cell.

6. The communication control device according to claim 3, wherein the decision index includes a received quality index calculated based on a reference signal received power (RSRP), and wherein the corrected term is factored into the calculation of the received quality index.

7. The communication control device according to claim 1, wherein the processor circuitry controls transmission power of at least one base station or at least one terminal device, and wherein the processor circuitry corrects the decision index by factoring in a corrected term indicating an influence of the control of the transmission power.

8. The communication control device according to claim 1, wherein the decision index indicates a throughput calculated using an index included in the measurement report, and wherein the processor circuitry factors in the influence of the interference control when an estimated value of the throughput after handover is calculated.

9. The communication control device according to claim 1, wherein the processor circuitry transmits a message to instruct the target base station to receive handover to the target base station when the processor circuitry decides that the target base station is to receive the connection of the first terminal device.

10. A communication control method that is performed by a communication control device, the communication control method comprising:

performing interference control for a radio communication system including a plurality of base stations and a plurality of terminal devices;

correcting a decision index which is based on a measurement report generated by a first terminal device by factoring in an influence of the interference control performed after the first terminal device performs measurement; and performing handover decision on the first terminal device using the corrected decision index, wherein the correcting further includes deciding whether a target base station selected using the corrected decision index is to receive connection of the first terminal device, and wherein the correcting further includes deciding whether the connection of the first terminal device is to be received by comparing a number of each type of terminal, of the terminals connected to the target base station and including the first terminal device, to a respective threshold value different for each type of terminal.

11. A radio communication system comprising:
a plurality of base stations;
a plurality of terminal devices; and
a control node configured to perform interference control for the radio communication system,
wherein the control node corrects a decision index which is based on a measurement report generated by a first terminal device by factoring in an influence of the interference control performed after the first terminal device performs measurement and performs handover decision on the first terminal device using the corrected decision index,
wherein the control node further decides whether a target base station selected using the corrected decision index is to receive connection of the first terminal device, and
wherein the control node further decides whether the connection of the first terminal device is to be received by comparing a number of each type of terminal, of the terminals connected to the target base station and including the first terminal device, to a respective threshold value different for each type of terminal.

12. The radio communication system according to claim 11, wherein the control node is a different node from the plurality of base stations.

13. The radio communication system according to claim 11, wherein the control node is a node mounted on the one of the plurality of base stations.

14. A communication control device comprising:
processing circuitry
configured to perform control of radio resources for a radio communication system including a plurality of base stations and a plurality of terminal devices; and
configured to correct a decision index which is based on a measurement report generated by a first terminal device by factoring in an influence of the control of the radio resources performed after the first terminal device performs measurement and to perform handover decision on the first terminal device using the corrected decision index,
wherein the control of radio resources further comprises deciding whether a target base station selected using the corrected decision index is to receive connection of the first terminal device, and
wherein the control of radio resources further comprises deciding whether the connection of the first terminal device is to be received by comparing a number of each type of terminal, of the terminals connected to the target base station and including the first terminal device, to a respective threshold value different for each type of terminal.

* * * * *